United States Patent
Benoit et al.

(10) Patent No.: US 9,735,953 B2
(45) Date of Patent: Aug. 15, 2017

(54) SIDE CHANNEL ANALYSIS RESISTANT ARCHITECTURE

(71) Applicant: QUALCOMM Incorporated, San Diego, CA (US)

(72) Inventors: Olivier Jean Benoit, San Diego, CA (US); Rosario Cammarota, San Deigo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/641,119

(22) Filed: Mar. 6, 2015

(65) Prior Publication Data

US 2016/0261403 A1 Sep. 8, 2016

(51) Int. Cl.
*G06F 9/00* (2006.01)
*G06F 9/24* (2006.01)
*H04L 9/00* (2006.01)

(52) U.S. Cl.
CPC .......... *H04L 9/003* (2013.01); *H04L 2209/08* (2013.01); *H04L 2209/12* (2013.01)

(58) Field of Classification Search
CPC .. H04L 9/003; H04L 2209/046; H04L 9/0612
USPC ....................................................... 713/189
See application file for complete search history.

(56) References Cited

U.S. PATENT DOCUMENTS

| | | | |
|---|---|---|---|
| 6,738,478 B1 * | 5/2004 | Vanstone | G06F 7/725 380/28 |
| 7,500,112 B1 * | 3/2009 | Wille | G06F 21/558 713/193 |
| 7,991,162 B2 | 8/2011 | Longa et al. | |
| 8,422,671 B2 * | 4/2013 | Yoon | H04L 9/28 380/28 |
| 8,879,724 B2 * | 11/2014 | Kocher | G06F 7/00 380/1 |
| 2010/0095133 A1 * | 4/2010 | Peter | G06F 7/00 713/189 |
| 2010/0174891 A1 * | 7/2010 | Nomoto | G06F 15/8015 712/222 |

(Continued)

FOREIGN PATENT DOCUMENTS

DE 19936938 A1 4/2000

OTHER PUBLICATIONS

Junfeng Fan; State-of-the-art of secure ECC implementations: a survey on known side-channel attacks and countermeasures; Virginia Tech, Blacksburg, VA; year: 2010; p. 76-87.*

(Continued)

*Primary Examiner* — Monjour Rahim
(74) *Attorney, Agent, or Firm* — Hunter Clark PLCC

(57) ABSTRACT

A distributed technique for implementing a cryptographic process performs operations in parallel on both valid and irrelevant data to prevent differentiation of the operations based on an encryption key content. A control entity switches or points valid data to appropriate CPU(s) that are responsible for operations such as squaring or multiplying. Irrelevant data is also switched or pointed to appropriate CPU(s) that execute operations in parallel with the CPU(s) operating on the valid data. The distributed technique contributes to obscuring side channel analysis phenomena from observation, such that cryptographic operations cannot easily be tied to the content of the encryption key.

30 Claims, 9 Drawing Sheets

(56) References Cited

U.S. PATENT DOCUMENTS

| | | | |
|---|---|---|---|
| 2011/0216900 A1* | 9/2011 | Yoon | H04L 9/28 380/28 |
| 2012/0221618 A1* | 8/2012 | Feix | G06F 7/5235 708/524 |
| 2013/0016828 A1* | 1/2013 | Teglia | G06F 7/723 380/28 |
| 2013/0064362 A1 | 3/2013 | Tang et al. | |
| 2013/0275646 A1 | 10/2013 | Kawasaki et al. | |
| 2014/0068231 A1* | 3/2014 | Saeki | G06F 9/30181 712/221 |
| 2014/0129604 A1* | 5/2014 | Clavier | G06F 17/10 708/606 |

OTHER PUBLICATIONS

Heyszl J., et al., "Clustering Algorithms for Non-Profiled Single-Execution Attacks on Exponentiations", CARDIS 2013, LNCS 8419, 2014, pp. 79-93.
Perin G., et al., "Attacking Randomized Exponentiations Using Unsupervised Learning", 2014, pp. 1-17.
Walter C.D., "Sliding Windows Succumbs to Big Mac Attack", CHES 2001, LNCS 2162, 2001, pp. 286-299.
Witteman M.F., et al., "Defeating RSA multiply-always and message blinding countermeasures", CT-RSA 2011, LNCS 6558, 2011, pp. 77-88.
International Search Report and Written Opinion—PCT/US2016/016959—ISA/EPO—Nov. 28, 2016—10 pgs.
Second Written Opinion from International Application No. PCT/US2016/016959 European Patent Office—Munich, Germany—Mar. 2, 2017—5 pgs.

\* cited by examiner

SIDE CHANNEL ANALYSIS RESISTANT ARCHITECTURE

BACKGROUND

Side channel analysis (SCA) is a technique that can be used to observe portions of a cryptographic process, such as a public/private key encryption or decryption process. SCA is carried out by observing operational characteristics of the cryptographic process implemented in hardware such as, for example, operation timing, power consumption or electromagnetic signature, to determine parameters of the cryptographic process. A processor carrying out a cryptographic process can be monitored to detect electromagnetic pulses related to operations involved in the cryptographic process, for example. An SCA attack on a cryptographic process analyzes, e.g., electromagnetic pulses from a processor carrying out a cryptographic process, to deduce the content of an encryption key. Determination of the encryption key with an SCA attack can render the encryption unsecure.

Two different cryptographic processes are typically implemented for communication over a network using public/private key pair encryption or decryption, an RSA operation and an ECC operation. The RSA process (RSA represents the initials for the creators of the underlying algorithm, Ron Rivest, Adi Shamir and Leonard Adleman) uses encryption keys that represent exponents used in a calculation to encrypt or decrypt blocks of symbols. A processor carrying out operations to implement the RSA process is typically configured to group operations between operations that square operands and operations that multiply operands for execution efficiency. The squaring operations and the multiplying operations are treated differently by the processor executing the RSA process. Typically, squaring can be done more efficiently within the processor than multiplying, and the difference in operations can be observed using SCA. An SCA attack on the RSA process typically seeks to determine when either of the square or multiply operations are carried out, and then relates those operations the cryptographic process. The selection of a squaring or a multiplying operation carried out in an RSA process is sensitive to the bits that form the encryption key. A processor carrying out the RSA process can be monitored for a number of parameters, such as signal timing, power consumption, or electromagnetic signatures, to detect the square or multiply operations and to deduce the bits of the encryption key that cause the operations to be carried out. For example, referring to FIG. 1, a trace 100 of electromagnetic radiation observed from a processor carrying out an RSA cryptographic process may be detected by monitoring the processor. Portions of the trace annotated with S or M, if detected, may be interpreted to indicate that the processor performed a square (S) operation or a multiply (M) operation, respectively.

The ECC (Elliptic Curve Cryptography) process uses public key cryptography similar to the RSA process. However, a processor implementing the ECC process typically executes a number of doubling and addition operations for encryption or decryption. The doubling operation is typically executed more efficiently on the processor than the adding operation, and the difference is observable using SCA. Selection of the doubling or adding operations in the EEC process execution is often sensitive to the bits of an encryption key. An SCA attack on the ECC process typically seeks to determine when either of the doubling or addition operations is carried out, and then relates those operations to the ECC process and the bits that form the encryption key. A processor carrying out the ECC process can be monitored for a number of parameters, such as signal timing, power consumption, or electromagnetic signatures, to detect the doubling or addition operations and to deduce the bits of the encryption key that relate to the operations being carried out.

SUMMARY

An example implementation provides an apparatus for implementing a cryptographic process comprising a first operation module configured to execute one of a first operation or a second operation, the first operation being different from the second operation, a second operation module configured to execute the other one of the first operation or the second operation, and a control module communicatively coupled to the first operation module and the second operation module and configured to provide first information to one of the first operation module or the second operation module such that during the cryptographic process at least one of the first operation or the second operation is performed at least once to produce irrelevant data.

Another example implementation provides a method for implementing a cryptographic process, the method comprising determining a selected one of a first operation or a second operation to receive first information to perform a respective one of the first operation or the second operation such that during the cryptographic process at least one of the first operation or the second operation is performed at least once to produce irrelevant data, performing the selected one of the first operation or the second operation using the first information and performing the other one of the first operation or the second operation concurrently with the selected one of the first operation or the second operation.

Another example implementation provides a non-transitory machine-readable medium comprising instructions for implementing a cryptographic process and being configured to cause a machine to determine a selected one of a first operation or a second operation to receive first information to perform a respective one of the first operation or the second operation such that during the cryptographic process at least one of the first operation or the second operation is performed at least once to produce irrelevant data, perform the selected one of the first operation or the second operation using the first information and perform the other one of the first operation or the second operation concurrently with the selected one of the first operation or the second operation.

Another example implementation provides an apparatus for implementing a cryptographic process, comprising means for determining a selected one of a first operation or a second operation to receive first information to perform a respective one of the first operation or the second operation such that during the cryptographic process at least one of the first operation or the second operation is performed at least once to produce irrelevant data, means for performing the selected one of the first operation or the second operation using the first information, and means for performing the other one of the first operation or the second operation concurrently with the selected one of the first operation or the second operation.

DETAILED DESCRIPTION

Figure 1:
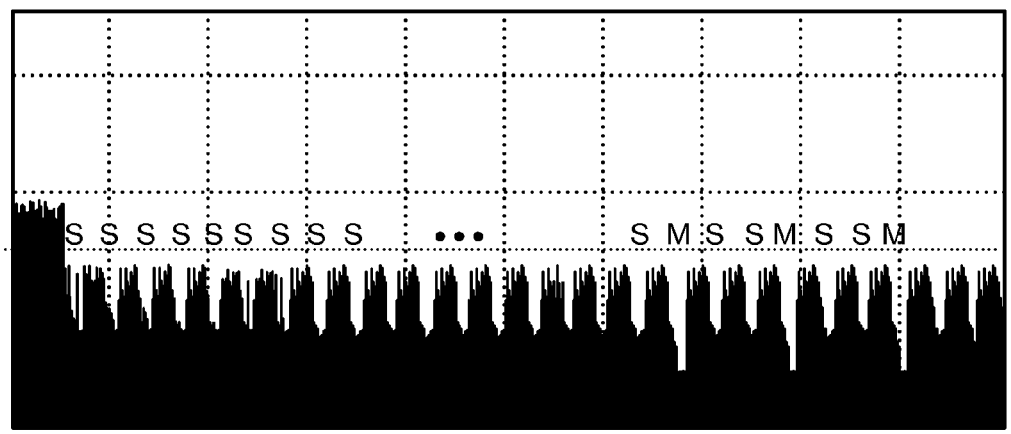
FIG. 1 is a trace of processor activity during a side channel analysis.

Distributed techniques for implementing a cryptographic process are presented. Some implementations of one or more of such techniques include performing operations in parallel on both valid data and irrelevant data to help prevent differentiation of the operations based on an encryption key content. Valid data refers to data that is input into the cryptographic process and manipulated according to an algorithm for implementing the cryptographic process (e.g., encrypted/decrypted) to produce a desired, expected or valid result. Irrelevant data refers to data that is input into and results from operations that produce intermediate results that are not relevant, or do not contribute, to producing the final desired, expected or valid result. Valid data can be used to form the irrelevant data, for example by using valid data in an operation that produces results that do not contribute to obtaining the final valid result. Irrelevant data can also be formed using arbitrary data or arbitrary data sources, or may be formed with non-arbitrary or planned data. A control entity may be provided that permits each one of at least two central processing units (CPUs) to access valid data or irrelevant data at different times during the cryptographic process in dependence upon the encryption key content. One CPU can access valid or irrelevant data, while another CPU can access valid or irrelevant data in a given iteration cycle of the cryptographic process. For example, the CPUs operate in parallel in at least some iterations, one CPU with valid data and one CPU with irrelevant data.

The operations performed by each of the CPUs may be the same or different and may or may not vary during the execution of the cryptographic process. The operations performed by the CPUs may include squaring and multiplying, or doubling and adding, and may be chosen based on the type of cryptographic process being executed. For example, one CPU may perform a squaring operation during a portion or all of the cryptographic process, while another CPU may perform a concurrent multiplying operation. Concurrent means that the operations are performed in a same cycle or iteration of the cryptographic process, whether or not the operations have a temporal overlap. The time at which the squaring operation and the multiplying operation are executed may at least partially overlap, e.g., execute at least partially in parallel.

Each of the CPUs may perform more than one type of operation during the execution of the cryptographic process. For example, a first CPU may be controlled to perform the squaring operation during some iterations of the cryptographic process, and controlled to perform the multiplying operation during other iterations. The implementation of the control of which CPU performs which operation at a given time during the cryptographic process is an internal process. The control is configured to select which CPU performs which operation, and ensures that the valid data is processed according to the appropriate operation (e.g., provided to the appropriate CPU performing the appropriate operation) to implement the algorithm for the cryptographic process. The control is preferably orders of magnitude smaller regarding SCA phenomena than is the multiplying or squaring operations. Accordingly, SCA may show different CPUs carrying out the same or different types of operations, but not necessarily which CPU is operating on valid data. With this technique, SCA may permit operations to be distinguished between the different CPUs, however, determination of the encryption key is insensitive to distinguishing the CPU operations.

The assignment of an operation to one or more CPUs may be done based on one or more of a variety of bases. For example, the first two CPUs that become available for implementing the cryptographic process can be used, with one CPU being assigned to perform one operation, such as multiplying, and the other CPU being assigned to perform the same or a different operation, such as multiplying or squaring. A CPU may be assigned an operation based on being configured to execute the operation efficiently. For example, a CPU may be implemented as a floating point processor, and may be assigned an operation that is more efficiently executed on such a processor. The assignment of an operation to a CPU may be programmed in software in accordance with the system in which the CPU is located. For example, knowledge of a computer system in which the distributed cryptographic process is to be implemented can be used to configure software to assign operations to certain CPUs in the computer system. Alternatively, or in addition, software used to implement the distributed cryptographic process can query a computer system to determine the configuration of the computer system and select CPUs for assignment of operations based on the query results. A control can be provided to change the operation being performed by a given CPU in different portions or iterations during execution of the cryptographic process. The control can operate on a variety of bases, including using randomly generated and/or preset changes for CPU operation. The control keeps track of the CPU(s) on which the valid data is being processed to ensure a valid end result is obtained.

An operation may be assigned to more than one CPU to take advantage of parallel execution or multitasking capability. Assignment of an operation to one or more CPUs permits significant flexibility in realizing certain design goals, such as, for example, synchronization of operations, load balancing among CPUs of different capabilities and other criteria that may assist in implementing an efficient and obscured distributed cryptographic process.

Valid data may be provided to one or more CPUs in some iterations or in each iteration of the cryptographic process. Which CPU receives the valid data, because of the operation to be performed on the valid data, is determined by the value of the encryption key. If the value of the encryption key calls for a squaring operation, the valid data is directed to the CPU that is assigned to squaring operations. If the value of the encryption key calls for a multiplying operation, the valid data is directed to the CPU that is assigned to the multiplying operation. The CPU that does not operate on the valid data may operate on the irrelevant data. Alternatively, or in addition, both CPUs may operate on valid data concurrently or may operate on irrelevant data concurrently. The results of operations conducted on valid data or on irrelevant data may be appropriately stored or discarded. For example, the result of an operation conducted on valid data may be used to overwrite irrelevant data that is used as an operand in another operation. The valid data result may be stored in a designated location reserved for a valid data, or a location that previously held irrelevant data. Operations in a given iteration of the cryptographic process may use only valid data, only irrelevant data or a combination of valid and irrelevant data for respective operands. For example, the cryptographic process may include one or more irrelevant iterations, where the results of the operations in such iterations are not used to contribute to obtaining a final, valid result. In such an example, the operands for the irrelevant iterations can be valid or irrelevant data. The cryptographic process may include more iterations than expected, to therefore contribute to dissociating the encryption key from the executed operations. In some iterations, one or more CPUs may perform no operation, or may perform an operation that is not used in the cryptographic process, for example performing an addition when the cryptographic process calls for squaring and multiplying operations.

The control entity may direct where the valid data and where the irrelevant data is to be obtained or provided, e.g., which CPU receives which data and where the result is stored. With each CPU carrying out a single, atomic operation in some iterations or in each iteration of the distributed cryptographic process, side channel phenomena are obscured with respect to observation of operations being executed in accordance with the content of the encryption key. An atomic operation refers to a low-level operation that can be performed independently of other operations, such as, for example, a multiplying operation, or a squaring operation.

An example apparatus for carrying out a distributed cryptographic process includes multiple CPUs so that operations can be divided among the CPUs. A processor may be defined to include one or more CPUs. For example, a processor may be implemented in hardware on one or more integrated circuit chips with one or more CPUs. Alternatively, or in addition, a processor may be implemented virtually to include one or more CPUs, for example by configuring the one or more CPUs to be treated and operated as a single processing unit. Multiple processors, each of which may include one or more CPUs, may also be used to implement the distributed techniques. One or more CPUs or processors may be assigned certain operations to perform during a cryptographic process. For example, one or more CPUs or processors may be assigned a squaring operation, while one or more other CPUs or processors may be assigned a multiplying operation. When the cryptographic process calls for a squaring operation, the one or more CPUs or processors assigned to the squaring operation perform the squaring operation. Similarly, multiplying operations called for in the cryptographic process are performed by the one or more CPUs or processors assigned to the multiplying operation. However, the one or more CPUs or processors assigned to a given operation that are not called upon to perform an assigned operation furthering the production of a valid end result in accordance with the cryptographic process may still perform the assigned operation on valid data, or on irrelevant data. The CPUs or processors involved in the cryptographic process may carry out an operation in each cycle of the cryptographic process, whether or not the CPU or processor is operating on valid cryptographic data. The CPUs or processors may be controlled to avoid carrying out an operation in one or more cycles of the cryptographic process.

An example apparatus may include one or more processors, where each processor may include one or more CPUs that are configured to carry out operations on valid cryptographic data or irrelevant data. A given processor is selected to operate on valid cryptographic data during the cryptographic process in accordance with a value of an encryption key. For example, when a bit value of the encryption key that is processed during the cryptographic process indicates that a multiplication should take place, valid cryptographic data is directed to a processor (or a processor is directed to the valid cryptographic data) that provides a multiplying operation. At the same time, another processor that is responsible for squaring operations is provided with (or is directed to) valid data or irrelevant data that is used as an operand for a squaring operation. The valid multiplying operation and the irrelevant squaring operation may take place concurrently.

According to an example implementation, in a given cycle or iteration of the cryptographic process, valid data is provided to or accessed by the appropriate processor that is assigned the desired operation in accordance with the value of an encryption key. Valid data or irrelevant data is also/alternatively provided to or accessed by another processor that is assigned a same or different operation. The valid data or irrelevant data may be provided to the intended processor using a pointer to a memory location that respectively includes the valid cryptographic data or that includes the irrelevant data. For example, a pointer to the valid data may be maintained and provided to the appropriate processor to permit access to the valid data. The appropriate processor reads the pointer and accesses the memory location pointed to by the pointer to obtain the valid data. A pointer to the irrelevant data may be maintained and provided to the intended processor to access the irrelevant data. By providing the pointers to the appropriate processors during the cryptographic process, the valid data, and/or the irrelevant data, can be effectively switched between the processors involved. Alternatively, or in addition, if the operation assigned to a given processor changes, pointers to the valid data, and/or the irrelevant data, can also be changed, to permit valid or irrelevant data to be switched between operations, even if not switched between processors.

The switching of valid data and/or irrelevant data between processors can be achieved according to a number of configurations. For example, pointers to memory locations can be used, as discussed above. Alternatively, or in addition, the valid data and/or irrelevant data can be stored by or in the processors, to permit the processors to access the data directly or to furnish the data to another processor. For example, the processors can exchange valid data and irrelevant data with each other. The data may also or alternatively be stored in multi-ported memory that can be accessed by several processors, and/or that may permit several processors to access the data concurrently. Pointers or addresses for the valid data and the irrelevant data can be maintained for the multi-ported memory to provide the processors with access to the desired data. The use of a pointer to identify the memory location and/or the processor(s) used to perform operations on valid data may permit switching of valid data between processor(s) with a relatively simple mechanism that exhibits a relatively small observable footprint. Observation of timing, power or electromagnetic parameters to detect a switch of valid data between processors is significantly more difficult than observing such parameters to detect whether a squaring or a multiplying operation is performed by a processor.

According to some examples, the different sets of processors responsible for respective operations are coupled to multi-ported memory. Each processor or set of processors responsible for a respective operation in the cryptographic process can access the memory to obtain operands, and write a result to the same memory. Since multiple processors can access the same multi-ported memory concurrently, intermediate results from operations conducted in accordance with the cryptographic process can be accessed by and operated on by the different processors concurrently. The multi-ported memory can thus be used as a tool to assist in distribution of the cryptographic process across multiple processors and switching data between the processors.

According to some examples, valid or irrelevant data may be used as an operand and/or an intermediate result during the distributed cryptographic process. For example, one or more processors may be provided with valid or irrelevant data as an input and operate on the data to produce a result, which is then used as an operand in a successive cycle or iteration of the cryptographic process. Valid or irrelevant data may be used to initialize an operand, which is operated on to produce a valid or irrelevant result, which is then used as an operand in a following cycle or iteration. The valid or irrelevant data can thus be carried through the cryptographic process together and coordinated so that it is unclear which is which when observing the valid or irrelevant data. For example, the valid or irrelevant data can be provided at specific memory locations, and memory transactions involving the valid or irrelevant data can occur at approximately a same time. Attempts to observe memory transactions to distinguish between valid and irrelevant data may thus be hampered, since it may not be clear which of the concurrent memory transactions is for valid or irrelevant data. The valid or irrelevant data may be discarded after being used in an operation that is not intended to operate on or produce valid results. Alternatively, the result of an operation that used valid or irrelevant data may be stored in multi-ported memory to permit access to the result by the processor(s) carrying out later operations. In addition, or alternatively, valid or irrelevant data can be newly provided in each cycle or iteration as an operand to an operation. In some circumstances, the provision of valid or irrelevant data at the beginning or during the cryptographic process may contribute to obscuring distinguishing characteristics of operations that produce valid data.

A control entity, such as a scheduler, may be provided to control switching of the valid data between the different processors and/or directing which processor(s) execute which operation. The control entity assigns processing of intermediary data to one or more processors at each stage in the cryptographic process. The control entity may track which processor(s) is(are) performing operations on valid data, and/or which processor(s) is(are) performing operations on arbitrary data. The control entity may control the selection of operations that are to be executed by one or more processors. The control entity may track which operation is being executed by which processor(s) and use the tracked data to determine the location of the valid data end result. The valid data operations result in obtaining the desired encryption/decryption output, while the result obtained using the arbitrary data can be discarded. The control entity can be implemented on one or more CPUs taking part in the cryptographic process, or can be implemented on one or more separate CPUs not engaged in the cryptographic process. The control entity can be implemented as a pointer controller, so that a pointer to valid data is passed to the appropriate processor(s). A similar configuration can be used to control a pointer to arbitrary data for use by the processor(s) that are not operating on the valid data in the given atomic operation. The pointers for the valid data or arbitrary data can specify locations in multi-ported memory that are accessible by the processors. A particular multi-ported memory location may hold the intermediary valid data throughout the cryptographic process.

Techniques and implementations provided herein relate generally to combating side channel analysis techniques used to discover encryption components, and relate more specifically to a multi-processor approach to split and obscure encryption operations to combat side channel analysis techniques. Techniques discussed herein can be used to obscure or resist side-channel analysis which might otherwise be used to observe cryptographic data during a cryptographic process execution. For example, a cryptographic process is distributed among two or more CPUs, with each CPU respectively performing atomic operations in parallel, either on valid cryptographic data, or on irrelevant data. An atomic operation may be an instance of a single type of operation, such as a single multiplying or a single squaring operation. Observed side channel parameters related to timing, power or electromagnetic output may appear indistinguishable between valid cryptographic data and irrelevant data.

Figure 2:
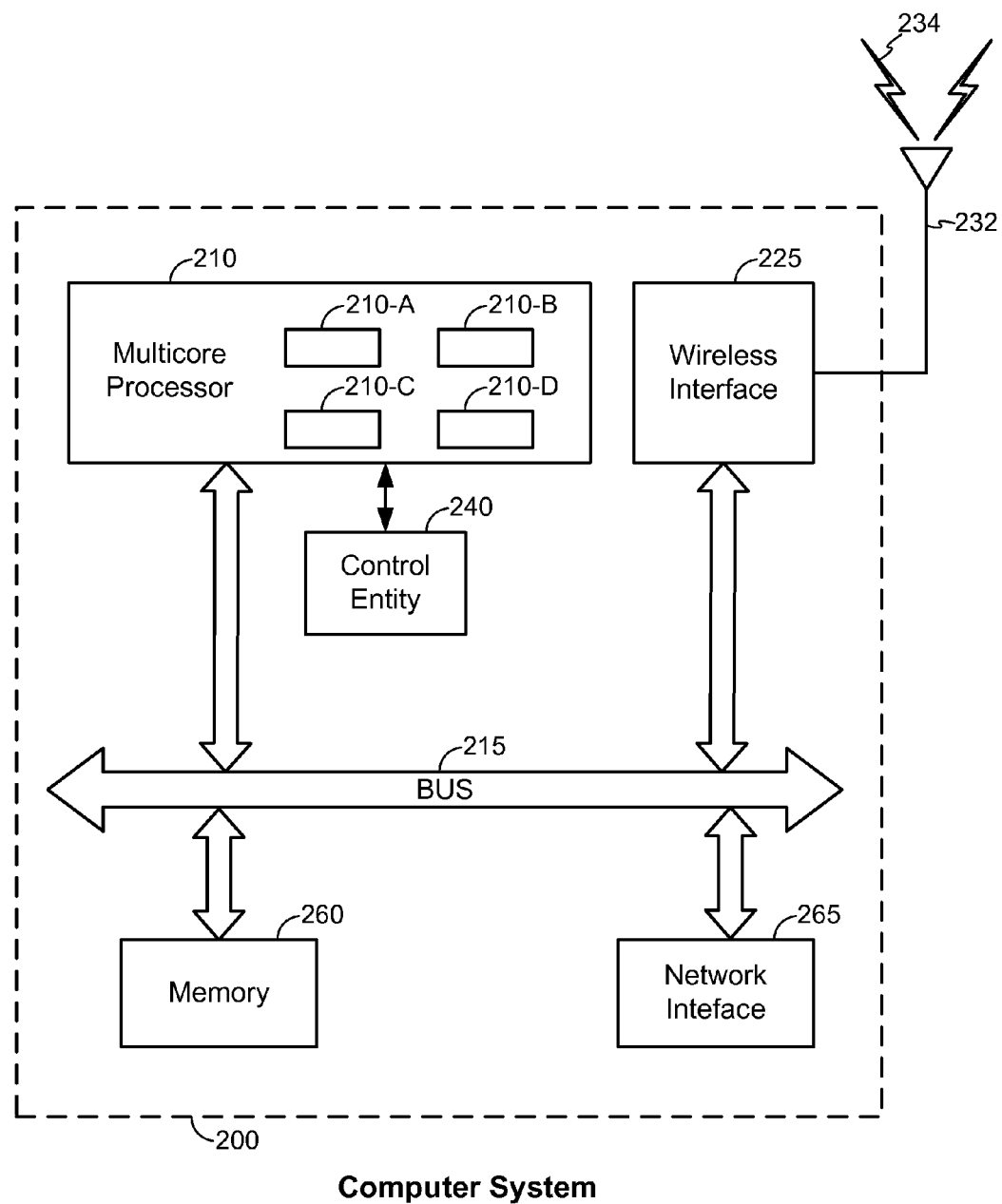
FIG. 2 is a block diagram of a computer system.

Referring to FIG. 2, a computer system 200 includes a multicore processor 210, a wireless interface 225, a control entity 240, a network interface 265, and a non-transitory memory 260. Computer system 200 is configured to operate with input and output cryptographic signals. For example, computer system 200 may receive encrypted data over a wireless or wired network connection and decrypt the encrypted data to recover original data. Similarly, computer system 200 may operate on original data to generate encrypted data for transmission over a wireless or wired network connection. Processor 210, wireless interface 225, memory 260, and network interface 265 are connected to each other by a bus 215. Control entity 240 is connected to multicore processor 210 to permit bidirectional signaling. Multicore processor 210 includes a number of central processing units (CPUs) 210-A, 210-B, 210-C and 210-D, which can share resources and operate independently and/or in parallel. Memory 260 is a shared memory for use by CPUs 210-A-210-D in multicore processor 210. Memory 260 may be implemented as a multi-ported memory with memory locations that can be co-accessed by different CPUs 210-A-210-D. Bus 215 is configured to support multiple CPUs 210-A-210-D and multiple memories 260, as well as multi-ported memories. For example, bus 215 can be configured to have additional lines to connect to gates in memory 260 to activate ports for different ones of CPUs 210-A-210-D.

Wireless interface 225 includes a wireless receiver, transmitter, transceiver, and/or other elements that enable computer system 200 to send and/or receive data using wireless communications protocols associated with one or more wireless wide area network (WWAN) systems, wireless local area networks (WLANs), and/or other types of wireless communication protocols that can be used to send and/or receive data. Wireless interface 225 is connected by a line 232 to an antenna 234 for sending and receiving communications to/from other wireless devices configured to communicate using wireless communication protocols.

Network interface 265 is configured to connect computer system 200 to one or more wired network connections. Network interface 265 is configured to permit computer system 200 to transmit and receive data via one or more wired data connections.

Multicore processor 210 can be an intelligent device, e.g., a personal computer processor such as those made or designed by Qualcomm, Intel® Corporation or AMD®, a microcontroller, an application specific integrated circuit (ASIC), or any other type of multiprocessing device. Multicore processor 210 can be implemented as physically separate CPUs 210-A-210-D or with two or more CPUs 210-A-210-D in a same physical package. In addition, CPUs 210-A-210-D need not be in the same geographical location, but can be distributed over a wide or local area network (WAN or LAN).

Memory 260 is a non-transitory storage device that can include random access memory (RAM), read-only memory (ROM), or a combination thereof. Memory 260 is configured to store processor-readable, processor-executable software code containing instructions for controlling multicore processor 210 to perform functions described herein (although the description may read that the software performs the function(s)). The software can be loaded into memory 260 by being downloaded via a network connection, uploaded from a disk, extracted from an image or loaded using any other type of data transfer technique. Further, the software may not be directly executable, e.g., requiring compiling before execution.

The software in the memory 260 is configured to enable multicore processor 210 to perform various actions, including resisting SCA attacks as described herein. The software may also be executed on one or more of CPUs 210-A-210-D, either individually or on a distributed basis. Distributed operation of CPUs 210-A-210-D may be controlled by one or more of CPUs 210-A-210-D or by control entity 240.

Although control entity 240 is shown separate from multicore processor 210, it may be implemented on one or more of CPUs 210-A-210-D, or partially or wholly separate from multicore processor 210. In addition, control entity 240 may be implemented as a remote component of computer system 200. Control entity 240 may be implemented on two or more of CPUs 210-A-210-D as a parallel process or as a coordinated control. For example, control entity 240 can receive or send signals between CPUs on which it is implemented to control process flow. As another example, control entity 240 may execute independently on more than one CPU, where the process flow is controlled by signals received by the CPUs that are indicative of execution of the cryptographic process. For instance, once an iteration of the cryptographic process has completed on two CPUs, the CPUs can signal each other, which signals are read by the independently executing control entity 240 on each CPU. The so implemented control entity 240 can then cause the CPU to use an appropriate operand for the next iteration of the cryptographic process, e.g., by pointing to valid data or to irrelevant data to be used by the CPU.

Control entity 240 may be integrated into a single one or several of CPUs 210-A-210-D to provide control or management of a software application that is executed on more than one of CPUs 210-A-210-D. In addition, or alternatively, distributed control or management of a distributed software application may be provided by control entity 240, which may be implemented as a separate core, CPU, microcontroller, or any other control device that can manage control of one or more of CPUs 210-A-210-D or memory 260. At least two of CPUs 210-A-210-D are used to implement cryptographic operations on a shared or distributed basis, and control of how the cryptographic operations are shared or distributed can be provided by one or more of CPUs 210-A-210-D, or by control entity 240 as a separate control device.

Figure 3:
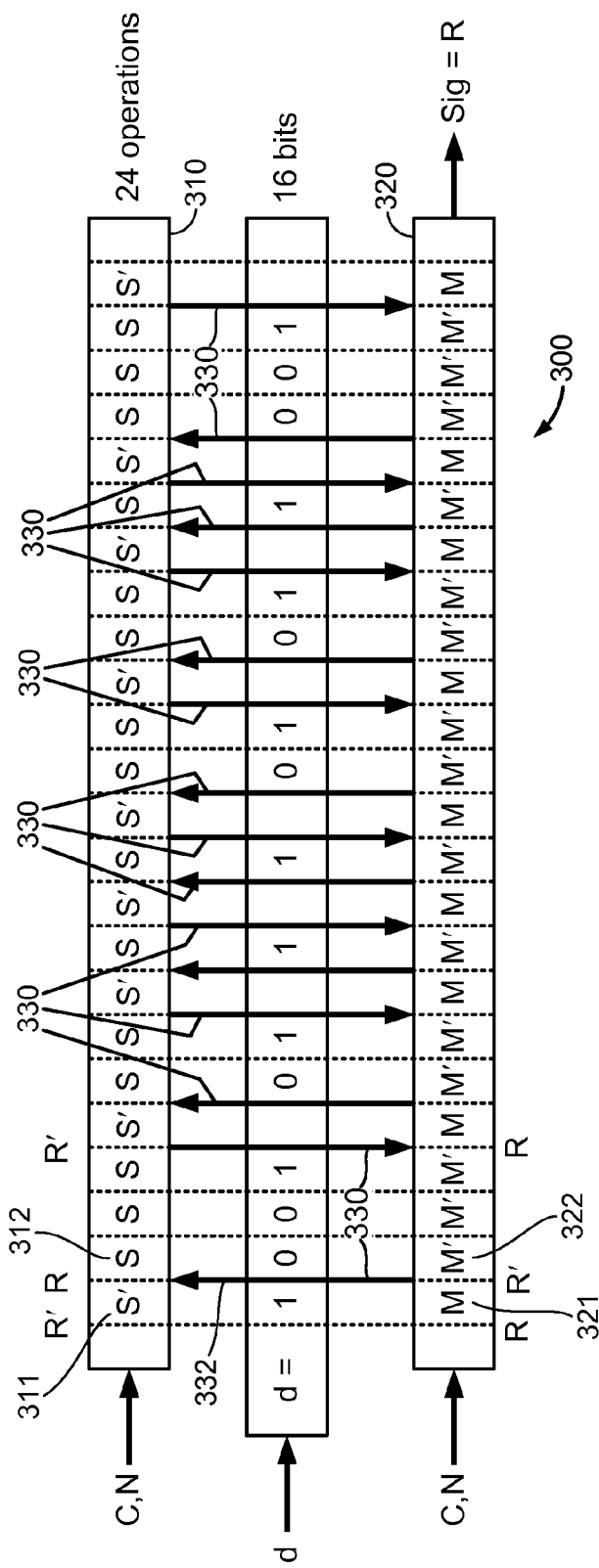
FIG. 3 is a process flow diagram that illustrates the flow of an example process for resisting side channel analysis.

Referring to FIG. 3, a process flow 300 illustrates an example of a cryptographic process. Process flow 300 shows parallel operations 310, 320 conducted for an RSA algorithm to process a communication C, with N being the modulus and d being a secret exponent or private key. The calculations performed in process flow 300 are in accordance with the following algorithm for performing an RSA cryptographic process.

```
R=1;
for (i=L-1 ; L>=0 ; L--)
{
    R=R² mod N;    //square
    if (dᵢ ==1);
        R=R*C mod N; //multiply
}
Sig = R
```

In the above algorithm, L is a length of the private key or secret exponent d, R is a valid intermediate result and Sig is an end result, communication C is the message that is the subject of the cryptographic operation, which can be, e.g., encryption or decryption. Modulus N is usually provided in conjunction with the public or private key, such as, for example, with secret exponent d. Secret exponent d is the private key used in the cryptographic process, and is kept confidential to ensure the integrity of the cryptographic process. Secret exponent d is represented as a vector with component values such as bits. Each bit can be identified by its place in secret exponent d, represented, for example, as bits $d_{L-1}, d_{L-2}, \ldots d_1, d_0$, ranked from most significant bit to least significant bit. In accordance with the algorithm, valid intermediate result R is initialized to 1. Valid intermediate result R is squared with each iteration as part of the ($R^2$ mod N) calculation. Valid intermediate result R, following the ($R^2$ mod N) calculation, is also modified by being multiplied in the (R*C mod N) calculation, if the current bit of secret exponent d is a 1. If the current bit of secret exponent d is not equal to 1, then the multiplying operation is skipped for that iteration of the algorithm.

Implementation of the above algorithm generally invokes a number of squaring and multiplying operations. Process flow 300 illustrates the squaring operations 310 being performed by one or more CPUs, which may be implemented with any of CPUs 210-A-210-D. Multiplying operations 320 can be performed by one or more CPUs, which also may be implemented with any of CPUs 210-A-210-D that are not simultaneously carrying out squaring operations 310. It is also possible to implement squaring operations 310 and multiplying operations 320 on a single CPU by interleaving operations of squaring and multiplying, for example.

According to process flow 300, a control entity, such as control entity 240, receives secret exponent d and controls the switching of valid intermediate data R between the available CPUs used to implement the cryptographic process. Communication C and modulus N, in whole or in part, are provided to each of the CPUs carrying out squaring operations 310 and multiplying operations 320. Valid intermediate result R, which holds the valid intermediate data, is initialized, as is irrelevant intermediate result R', which serves as a placeholder for an irrelevant intermediate result. Valid intermediate result R is initialized, for example, to 1. Irrelevant intermediate result R' can be initialized to an arbitrary value, including the same value as is provided to initialize valid intermediate result R. Iterations through the RSA algorithm are started using the components of secret exponent d. Initially, the first component of secret exponent d is determined to be a 1. Since valid intermediate result R is initialized to 1, there is no need to implement squaring operation 310 initially, as a result of obtaining 1 by squaring 1 is assumed. The first operation performed on valid intermediate result R is therefore an initial multiplying operation 321, designated as M. Irrelevant intermediate result R' is provided as an operand to an initial squaring operation 311, which is designated as S'.

The designations of S and M are used to indicate a respective squaring or multiplying operation on valid intermediate result R. The designations of S' and M' are used to indicate a respective squaring or multiplying operation on irrelevant intermediate result R'. These designations are applied consistently to refer to results and operations during process flow 300. For example, a multiplying operation using irrelevant intermediate result R' as an operand is designated as M', and the result of the multiplying operation is stored in irrelevant intermediate result R'. Irrelevant intermediate result R' is thus updated by being applied to squaring operation S' or multiplying operation M', while valid intermediate result R is similarly updated by being applied to squaring operation S or multiplying operation M. With these designations, initial squaring operation 311, designated as S', updates irrelevant intermediate result R', while initial multiplying operation 321, designated as M, updates valid intermediate result R. In this configuration, both squaring and multiplying operations are performed, even though one operation is performed with valid or irrelevant data to obtain an irrelevant result, and one operation is performed with valid data to obtain a valid result.

Irrelevant intermediate result R' need not be updated with each iteration of the cryptographic process depicted in process flow 300. For example, a new valid or irrelevant value may be assigned to irrelevant intermediate result R' in each iteration of the cryptographic process. In such a scenario, the results of performing squaring operation S' or multiplying operation M' may be discarded following execution of the operation, rather than being used to update irrelevant intermediate result R'.

In the iteration following the initial operations, valid intermediate result R is subjected to squaring operation 312 designated as S, which produces an updated valid intermediate result R. In parallel, irrelevant intermediate result R' is subjected to multiplying operation 322 designated as M', which produces an updated irrelevant intermediate result R'. Accordingly, in the second iteration, the CPU(s) carrying out squaring operations 310 is(are) pointed to valid intermediate result R as an operand, and performs (perform) squaring operation 312 designated as S to update valid intermediate result R. The CPU(s) carrying out multiplying operations 320 is(are) pointed to irrelevant intermediate result R' as an operand (which can be valid intermediate result R), and perform multiplying operation 322 designated as M'. The change in pointing the CPUs to either valid intermediate result R or irrelevant intermediate result R' is illustrated with an arrow 332. Results of operations carried out using valid intermediate result R as an operand are stored in valid intermediate result R. In addition, results of operations carried out using irrelevant intermediate result R' as an operand are discarded or stored in irrelevant intermediate result R'. Accordingly, respective valid and irrelevant intermediate results R and R' can be updated by the applied operations, and are carried through each iteration of the cryptographic process.

With this arrangement, respective valid and irrelevant intermediate results R and R' are switched between the CPU(s) carrying out respective squaring operations 310 and multiplying operations 320. The switching of the intermediate results between the CPUs, illustrated with arrows 330, can be achieved according to various techniques. For example, control entity 240 shown in FIG. 2 controls the switching of respective valid and irrelevant intermediate results R and R' between CPUs using pointers. Valid and irrelevant intermediate results R and R' need not be different values, and therefore need not be switched in such an instance. For example, the CPU(s) carrying out respective squaring operations 310 and multiplying operations 320 can each use valid intermediate result R as an operand. The results of the operations executed by the appropriate CPU(s) that produce a valid or desired result are maintained in valid intermediate result R, while the other results are irrelevant, and may be discarded or stored in irrelevant intermediate result R'.

Control entity 240 points the CPU(s) performing squaring operation 312 to valid intermediate result R, while also pointing the CPU(s) performing multiplying operation 322 to irrelevant intermediate result R' (which may be the same location as valid intermediate result R). This configuration may use different storage techniques to permit rapid pointer adjustment, retrieval and storage of respective valid and irrelevant intermediate results R and R' following the appropriate squaring operations 310 or multiplying operations 320. For example, control entity 240 may control access to two different storage locations, one each for valid intermediate result R and irrelevant intermediate result R'. Control entity 240 can then point the appropriate CPU(s) to either valid intermediate result R or irrelevant intermediate result R' to obtain the operand for a valid data operation (S or M) or to obtain the operand for an irrelevant data operation (S' or M'). For example, the storage locations for respective valid and irrelevant intermediate results R and R' may be located in multi-ported memory, which may be implemented as memory 260 (FIG. 2), to permit access by multiple CPUs, potentially concurrently. Control entity 240 may provide an address in the multi-ported memory to the appropriate CPU(s) to permit access to respective valid and irrelevant intermediate results R and R'. In addition, or alternatively, control entity 240 may load respective valid and irrelevant intermediate results R and R' into local memory for the CPUs, in accordance with whether the respective CPU(s) are to operate on valid data or on irrelevant data (which may be obtained from the valid data). Many other switching schemes are available and possible, as long as valid intermediate result R can be accessed for the appropriate valid squaring or multiplying operations, so that a correct valid result can ultimately be obtained.

In some iterations, one or both of valid intermediate result R and irrelevant intermediate result R' are tracked as squaring and/or multiplying operations are applied, so that a correct result can be obtained by referencing valid intermediate result R. In addition, or alternatively, valid intermediate result R is tracked and irrelevant intermediate result R' is not tracked in some iterations of the cryptographic process. In such an instance, irrelevant intermediate result R', when used as an operand, may be valid data, arbitrary data or planned data. The content or value of irrelevant intermediate result R' is unimportant to obtaining a valid final result for the cryptographic process. In some configurations, irrelevant intermediate result R' need not be stored, which can avoid additional memory operations. In such an instance, irrelevant intermediate result R' may be generated under the direction of control entity 240, such as by instructing the appropriate CPU(s) to obtain or generate valid or irrelevant data for irrelevant intermediate result R'. In other instances, control entity 240 may cause both valid intermediate result R and irrelevant intermediate result R' to be stored and retrieved and tracked, so that there is little or no distinction between management of valid data and irrelevant data with respect to operations conducted by the active CPU(s).

According to another example, valid intermediate result R is not tracked during applied squaring and multiplying operations. In such an instance, the values of the components of secret exponent d are used to direct appropriate CPU(s) to valid intermediate result R as an operand, or to direct valid intermediate result R to the appropriate CPU(s), and the final value of valid intermediate result R is used as the desired result of the cryptographic process. In addition, or alternatively, if the storage location of valid intermediate result R changes during the cryptographic process, for example, by being switched with irrelevant intermediate result R', the final location of valid intermediate result R can be determined by tracking the storage location changes, or by reviewing the sequence of component values of secret exponent d to determine the final location of valid intermediate result R.

As squaring operations 310 and multiplying operations 320 continue to be applied to both valid intermediate result R and irrelevant intermediate result R' as operands during the cryptographic process to obtain valid intermediate result R and irrelevant intermediate result R' as results, little or no distinction between valid and irrelevant operations can be detected by SCA. As implemented with the cryptographic process depicted by process flow 300, a squaring operation and a multiplying operation are both performed with each iteration or cycle, so that the value of secret exponent d cannot be easily differentiated based on SCA. The operations conducted by control entity 240 to switch valid intermediate result R and irrelevant intermediate result R' between the appropriate CPUs is significantly more difficult to detect using SCA than the squaring and multiplying operations. For example, SCA of such switching operations may produce observable phenomena that is several orders of magnitude smaller than that produced by squaring and/or multiplying operations. Determining that a switching operation has occurred in process flow 300 is thus very difficult using SCA, and determining whether valid or irrelevant data are being squared or multiplied is likewise very difficult. Accordingly, the cryptographic operations conducted in accordance with process flow 300 are highly difficult to associate with a component value of secret exponent d because each respective CPU performs either a squaring or a multiplying operation with each iteration. The value of secret exponent d is thus highly obscured with the configuration depicted by process flow 300 because monitoring any single CPU will show a series of squaring operations or a series of multiplying operations, and whether the monitored operation as an operand or result that is valid or irrelevant will not be clear. As discussed in more detail below, the operation executed by a given CPU may be changed, and the reference to the valid data may be changed in coordination with the operation change. In such a configuration, the value of secret exponent d continues to be highly obscured, because monitoring any single CPU will show either squaring or multiplying operations that are dissociated from the value of secret exponent d.

As illustrated in process flow 300, squaring operations 310 and multiplying operations 320 continue to be employed on both valid data and irrelevant data, while control entity 240 switches valid intermediate result R as appropriate to obtain valid calculations and a valid end result. Arrows 330 illustrate when valid intermediate result R is switched to appropriate CPUs to apply squaring operations 310 or multiplying operations 320. Switching valid intermediate result R to the appropriate CPUs coincides with the current component value of secret exponent d. For example, in accordance with the above-noted RSA algorithm, each time the current component (bit) of secret exponent d is a 1, a multiplying operation is performed in addition to a squaring operation, so valid intermediate result R is switched to multiplying operations 320, as indicated with a corresponding arrow 330. When the current component (bit) of secret exponent d is a 0, at least two consecutive squaring operations 310 are performed on valid intermediate result R, since a multiplying operation 320 is skipped. Accordingly, while there can be multiple consecutive squaring operations 310 on valid intermediate result R, there is at most a single consecutive multiplying operation 320. At the conclusion of the cryptographic process illustrated in process flow 300, once all of appropriately applied squaring operations 310 and multiplying operations 320 have been employed, valid intermediate result R holds the final valid result, which is assigned to the result Sig, which represents the encrypted or decrypted communication.

Figure 4:
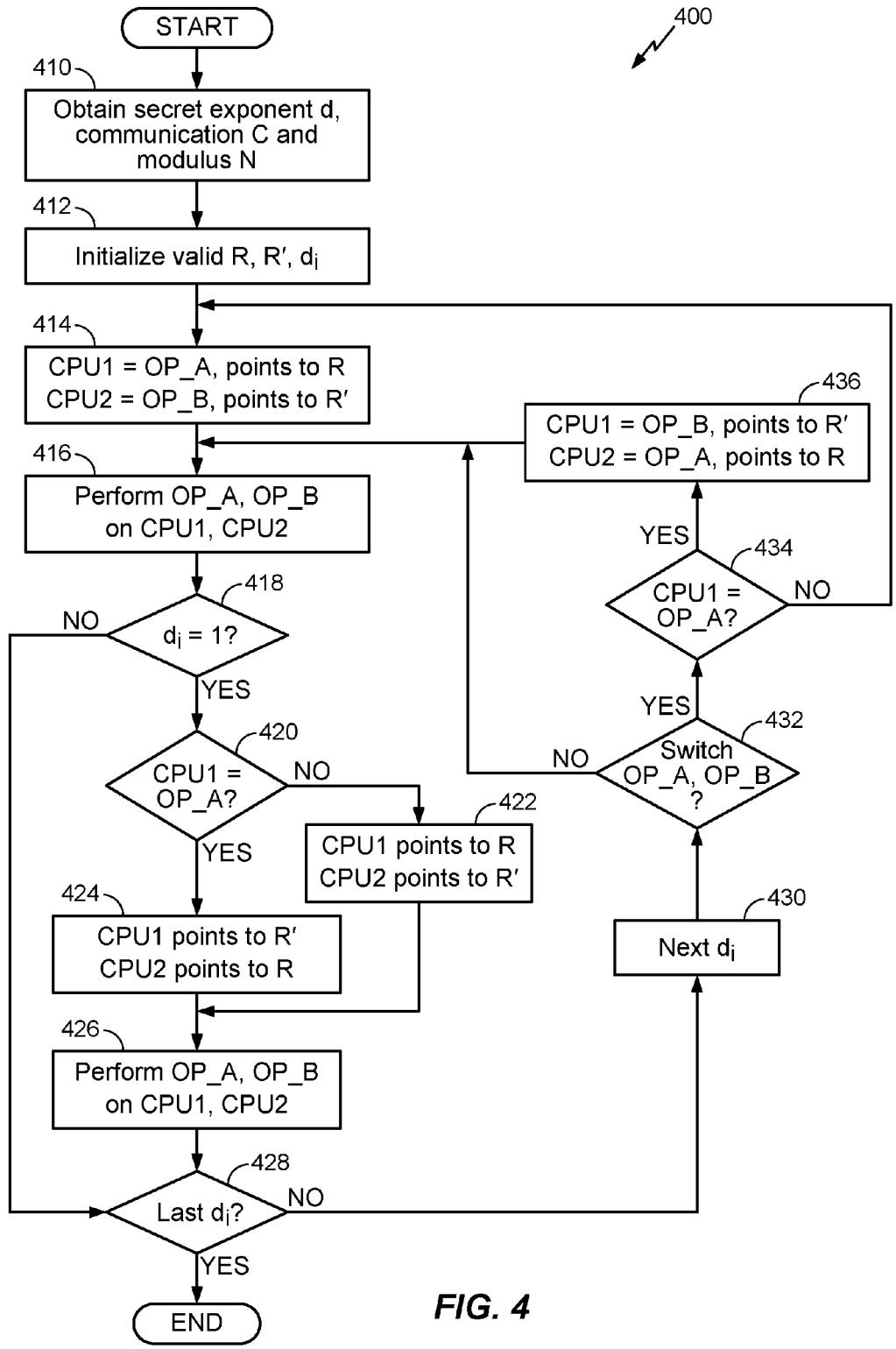
FIG. 4 is a flowchart diagram of an example process for resisting side channel analysis.

Referring now to FIG. 4, a flowchart 400 illustrates a process for distributed cryptographic operations. The process illustrated in flowchart 400 may be implemented on computer system 200 (FIG. 2), and begins with obtaining secret exponent d, communication C and modulus N, as illustrated in a block 410.

Valid intermediate result R, irrelevant intermediate result R', and a component $d_i$ of secret exponent d are initialized, as illustrated in a block 412. The component $d_i$ is initialized to a most significant bit of secret exponent d as a starting point for an encryption/decryption process. An initial value of valid intermediate result R is set to 1, while an arbitrary value, which can be the same as that used for valid intermediate result R, is used as an initial value for irrelevant intermediate result R'.

A block 414 illustrates a CPU1 being initialized to a first operation OP_A, which is a squaring operation, and to point to valid intermediate result R. In addition, block 414 illustrates a CPU2 being initialized to a first operation OP_B, which is a multiplying operation, and to point to irrelevant intermediate result R'. CPU1 and CPU2 can each be implemented as multicore processor 210, or as one or more of CPUs 210-A-210-D (FIG. 2). CPU1 and CPU2 can be configured to execute operations concurrently, and/or can be implemented as one or more of CPUs 210-A-210-D to execute operations in a non-temporally overlapping configuration, meaning that CPU1 and CPU2 can each take turns being implemented as one or more of CPUs 210-A-210-D. The process illustrated in flowchart 410 can be configured to have OP_A be a multiplying operation and to have OP_B be a squaring operation, for example, in which case CPU1 would be initialized to point to irrelevant intermediate result R' and CPU2 would be initialized to point to valid intermediate result R.

Block 414 illustrates a setting or a resetting of parameters for CPU1 and CPU2 during the cryptographic process. For example, control entity 240 (FIG. 2) can initially or during the cryptographic process designate OP_A and valid intermediate result R for one of CPU1 or CPU2, and designate OP_B and irrelevant intermediate result R' for the other of CPU1 or CPU2. Control entity 240 can set pointers to control which of CPU1 and CPU2 points to valid intermediate result R and which one points to irrelevant intermediate result R'. In this way, OP_A as a squaring operation, such as squaring operation 310 (FIG. 3), at the beginning of an iteration of the cryptographic process, uses valid intermediate result R as an operand and OP_B as a multiplying operation, such as operation 320 (FIG. 3) uses irrelevant intermediate result R' as an operand.

With CPU1 initially set to execute OP_A and pointing to valid intermediate result R, and CPU2 initially set to execute OP_B and pointing to irrelevant intermediate result R', CPU1 is caused to perform OP_A on valid intermediate result R, and CPU2 is caused to perform OP_B, as illustrated in a block 416. In an initial cycle or iteration, OP_A is a squaring operation that performs the calculation of $R^2$ mod N on CPU1 and OP_B is a multiplying operation that performs R'*C mod N on CPU2. Accordingly, CPU1 uses valid intermediate result R as an operand, while CPU2 uses irrelevant intermediate result R' as an operand.

As part of the cryptographic process illustrated with flowchart 400, component $d_i$ of secret exponent d, e.g., the current bit under inspection, is evaluated to determine if it is equal to 1, as illustrated in a decision block 418. If the component of secret exponent d is not equal to 1, the cryptographic process proceeds to the next iteration, as illustrated by the No branch from decision block 418 leading to a decision block 428, which checks for a loop exit. If the current component $d_i$ of secret exponent d is equal to 1, the cryptographic process proceeds to determine if OP_A is assigned to CPU1, as illustrated in a decision block 420. If OP_A (modular squaring) is assigned to CPU1, as indicated by the Yes branch of decision block 420, CPU1 is set to point to irrelevant intermediate result R' and CPU2 is set to point to valid intermediate result R, as illustrated in a block 424. If OP_A is not assigned to CPU1, as illustrated by the No branch of decision block 420, CPU1 is set to point to valid intermediate result R and CPU2 is set to point to irrelevant intermediate result R', as illustrated in a block 422. Decision block 420 thus illustrates the switching of valid intermediate result R to a CPU that is executing a multiplying operation. The cryptographic process can be configured to check if OP_A is assigned to CPU1, or if OP_B is assigned to CPU2 in the stage represented by decision block 420, with the respective CPUs being pointed to the appropriate valid intermediate result R or irrelevant intermediate result R' based on the result.

Block blocks 420, 422 and 424 illustrate switching of references between valid intermediate result R and irrelevant intermediate result R', based on which CPU is executing which operation. The switching process can be implemented by, for example, control entity 240, which provides a pointer to CPU1 or CPU2 to reference valid intermediate result R or irrelevant intermediate result R' as appropriate. Control entity 240 can identify which of CPU1 and CPU2 is carrying out OP_B, or multiplying, and thus provide a pointer to valid intermediate result R to the appropriate CPU for that operation. Control entity 240 can identify which of CPU1 and CPU 2 is carrying out OP_A, or squaring, and thus provide a pointer to irrelevant intermediate result R' to the appropriate CPU for that operation. Control entity 240 can be configured to provide a pointer to valid intermediate result R to both CPU1 and CPU2, so that both CPUs news valid data as an operand. A block 426 illustrates CPU1 and CPU2 carrying out OP_A or OP_B, whichever operation is assigned to the respective CPU by control entity 240. With this approach, the appropriate CPU performs OP_A or $(R')^2$ mod N using irrelevant intermediate result R' as an operand and the other CPU performs OP_B or R*C mod N using valid intermediate result R. In accordance with these operations, the appropriate operation is applied to the appropriate operand in accordance with the value of component $d_i$, independent of which CPU carries out which operation. OP_A and/or OP_B may also/alternatively both use valid intermediate result R as an operand, which in this case of OP_A is an irrelevant operand and produces an irrelevant result.

The cryptographic process illustrated in flowchart 400 ends when the last component $d_i$ of secret exponent d is processed, as illustrated with a decision block 428 being provided with a Yes branch that leads to the end of the process in response to the test of whether the last component $d_i$ has been processed. Typically, for an RSA cryptographic process, the last component $d_i$ of secret exponent d to be processed is the least significant bit. If further components $d_i$ of secret exponent d remain to be processed, the next component $d_i$ of secret exponent d is selected for processing, as is illustrated with the No branch of decision block 428 being directed to block 430. Block 430 illustrates the selection of the next component $d_i$ of secret exponent d to set up the next iteration of the algorithm for the cryptographic process.

As part of a set up for another iteration of the cryptographic process illustrated in flowchart 400, a determination is made as to whether the operations assigned to CPU1 and to CPU2 should be switched. This determination is illustrated with decision block 432, where the No branch leads to block 416 for another iteration of the cryptographic process, and the Yes branch leads to a decision block 434 to examine which CPU is executing which operation.

The decision whether to switch the operations being executed by CPU1 and CPU2 can be performed by control entity 240. The decision can be based on various criteria, including a predetermined or random timing for switching operations assigned to the CPUs, a predetermined or random sequence for switching or an event driven trigger for switching, to name a few possibilities. The predetermined or random timing can be used to provide an indication at certain periodic time intervals or at random length time intervals, respectively, that the switch should take place, which intervals may be shorter, the same as or longer than a cycle or iteration of the cryptographic process. The predetermined or random sequence can be used to provide an indication that the switch should take place at certain iterations or at random iterations, respectively. The event driven trigger can be used to provide an indication that the switch should take place upon notification of a certain event, such as, for example, by execution of an instruction, trap or interrupt by either of CPU1 or CPU2. In some cases, CPU1 and/or CPU2 rather than control entity 240 is used to make the determination of when operations should be switched between CPUs.

Once a determination is made that the operations should be switched, CPU1 or OP_A is checked to determine if they are assigned to each other, as illustrated in decision block 434. The process can also be configured to check CPU2 or OP_B to determine if they are assigned to each other. If OP_A is not assigned to CPU1, as illustrated with the No branch of decision block 434, then OP_A is assigned to CPU1, CPU1 is pointed to valid intermediate result R and OP_B is assigned to CPU2, which is pointed to irrelevant intermediate result R', as is illustrated in block 414. If OP_A is currently assigned to CPU1, then the operations are switched between CPUs, so that OP_B is assigned to CPU1, which is pointed to irrelevant intermediate result R' and OP_A is assigned to CPU2, which is pointed to valid intermediate result R, as is illustrated in a block 436. Following the assignment of operations to CPUs, the cryptographic process continues with the performance of OP_A or OP_B by the assigned one of CPU1 or CPU2, as is illustrated in block 416. With this portion of the cryptographic process, the operation assignments to CPUs are reset, as is the pointer assignment of the CPUs to valid intermediate result R or irrelevant intermediate result R'.

Regardless of the assignment of operations to CPUs, valid intermediate result R is used as an operand for OP_A, or the squaring operation, and irrelevant intermediate result R' is used as an operand for OP_B, or the multiplying operation, in the first operation of each iteration of the cryptographic process. Moreover, valid intermediate result R is used as an operand for OP_B, or the multiplying operation, and irrelevant intermediate result R' is used as an operand for OP_A, or the squaring operation, in the secondary, conditional operation (e.g. if $d_i$ is a 1) of the cryptographic process. The switching of operations between CPUs, like the switching of CPUs to point to operands, produces SCA events that are several orders of magnitude smaller than that of the squaring or multiplying operations. Accordingly, detection of the switching operations is relatively very difficult using SCA in comparison with detection of squaring or multiplying operations.

Although flowchart 400 illustrates a determination of whether to switch operations between CPUs once during each iteration of the cryptographic process, other implementations are possible. For example, such a switching determination can be made several times in each iteration, such as prior to the determination illustrated in decision block 420, or before or after each time OP_A and/or OP_B is performed. In addition, or alternatively, the switching determination may be made during some iterations and not others. For example, a flag can be set or reset to indicate in which iteration(s) the switching determination should be made. Thus, switching and/or the switching determination can be executed with lesser, the same or greater frequency than the frequency at which iterations occur.

Figure 5:
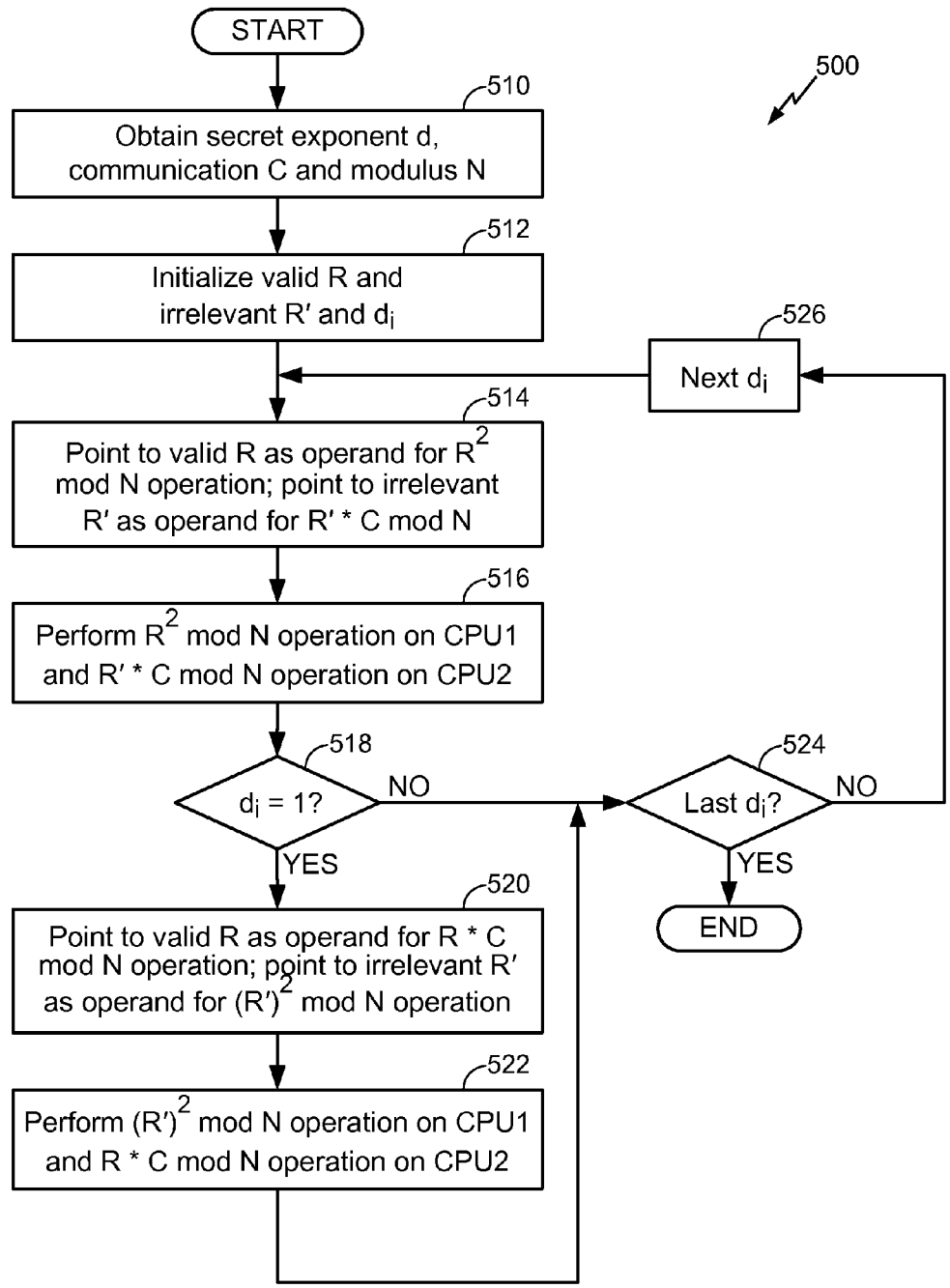
FIG. 5 is a flowchart diagram of another example process for resisting side channel analysis.

Referring now to FIG. 5, a flowchart 500 illustrates a process for distributed cryptographic operations. The process illustrated in flowchart 500 may be implemented on computer system 200 (FIG. 2), and begins with obtaining secret exponent d, communication C and modulus N, as illustrated in a block 510.

A block 512 illustrates variable initialization for the cryptographic process, with initialization of valid intermediate result R and irrelevant intermediate result R', as well as initialization of a value for a component $d_i$, which represents a first component value of secret exponent d. In the process illustrated in FIG. 5, a most significant bit of secret exponent d is used as a starting point for an encryption/decryption process. An initial value of valid intermediate result R is set to 1, while an arbitrary value, which can be the same as that used for valid intermediate result R, is used as an initial value for irrelevant intermediate result R'.

Valid intermediate result R is referenced with a pointer as an operand for the $R^2$ mod N operation, and irrelevant intermediate result R' is referenced with a pointer as an operand for the R'*C mod N operation, as illustrated in a block 514. The pointers for valid intermediate result R and irrelevant intermediate result R' can be configured to point to the same memory location, e.g., that of valid intermediate result R. The portion of the cryptographic process illustrated in block 514 resets the pointers that are used to reference valid intermediate result R and irrelevant intermediate result R'. For example, control entity 240 sets pointers such that the valid intermediate result R is pointed to for the CPU that will execute the squaring operation and such that the irrelevant intermediate result R' is pointed for the CPU that will execute the multiplying operation. In this way, a squaring operation, such as squaring operation 310 (FIG. 3), at the beginning of an iteration of the cryptographic process uses valid intermediate result R as an operand and the multiplying operation, such as multiplying operation 320 (FIG. 3) uses irrelevant intermediate result R' as an operand.

With valid intermediate result R and irrelevant intermediate result R' being set to the appropriate values, the squaring and multiplying operations are performed, as illustrated in a block 516. The modular squaring operation $R^2$ mod N is executed on CPU1, while the modular multiplying operation R'*C mod N is executed on CPU2. CPU1 and CPU2 each perform the same respective operations of squaring and multiplying throughout the process illustrated in flowchart 500. As shown in block 516, CPU1 uses valid intermediate result R as an operand, while CPU2 uses irrelevant intermediate result R' as an operand.

As depicted in a decision block 518, component $d_i$ of secret exponent d, e.g., the current bit under inspection, is evaluated to determine if it is equal to 1. If component $d_i$ of secret exponent d is not equal to 1, the cryptographic process proceeds to the next iteration, as illustrated by the No branch from decision block 518 leading to a decision block 524 that illustrates a determination of a loop exit. If the current component of secret exponent d is equal to 1, the cryptographic process proceeds to a multiplying step, as illustrated with the Yes branch from decision block 518 leading to a block 520.

Block 520 illustrates the switching of references between valid intermediate result R and irrelevant intermediate result R'. For example, control entity 240 provides a pointer to CPU1 to reference irrelevant intermediate result R' as an operand, and a pointer to CPU2 to reference valid intermediate result R as an operand. The pointers for valid intermediate result R and irrelevant intermediate result R' can be configured to point to the same memory location, e.g., that of valid intermediate result R. A block 522 illustrates CPU1 and CPU2 carrying out their respective squaring and multiplying operations with the respective operands. The results of the squaring operation executed on CPU1 is stored in irrelevant intermediate result R' and the results of the multiplying operation executed on CPU to is stored in valid intermediate result R. Alternatively, the results of the squaring operation executed on CPU1 can be discarded. With this approach, CPU1 executes a squaring operation $(R')^2$ mod N using irrelevant intermediate result R' as an operand and CPU2 executes a multiplying operation R*C mod N using valid intermediate result R. In accordance with these operations, CPU1 and CPU2 respectively execute squaring and multiplying operations on a consistent basis, regardless of whether they are acting on valid or irrelevant data.

The cryptographic process ends when the last component of secret exponent d is processed, as illustrated with decision block 524 being provided with a Yes branch that leads to the end of the process in response to the test of whether the last component $d_i$ has been processed. Typically, for an RSA cryptographic process, the last component of secret exponent d to be processed is the least significant bit. If further components $d_i$ of secret exponent d remained to be processed, the next component $d_i$ of secret exponent d is selected for processing, as is illustrated with the No branch of decision block 524 being directed to block 526. Selection of the next component $d_i$ of secret exponent d sets up the next iteration of the algorithm for the cryptographic process, as illustrated by block 526 being directed to block 514. Block 514 illustrates a pointer reset so that valid intermediate result R can again be used by CPU1 in the squaring operation, and irrelevant intermediate result R' can again be used by CPU2 in the multiplying operation.

In accordance with other examples, two or more CPUs can be synchronized with respect to differing operations, such as squaring and multiplying. For example, a CPU that implements squaring operations may execute each of those operations in a shorter or longer time frame compared with the multiplying operations performed on another CPU. Where the CPUs are configured to implement a distributed algorithm, the CPUs can be synchronized to permit the operations to continue to be conducted concurrently or in parallel. According to some embodiments, padding instructions, such as NOP (no operation) instructions can be can be executed by a CPU that completes execution of an assigned operation faster than a counterpart CPU concurrently executing a different assigned operation. In this way, the CPUs can be synchronized by both being caused to take approximately a same amount of time for executing different operations.

Figure 6:
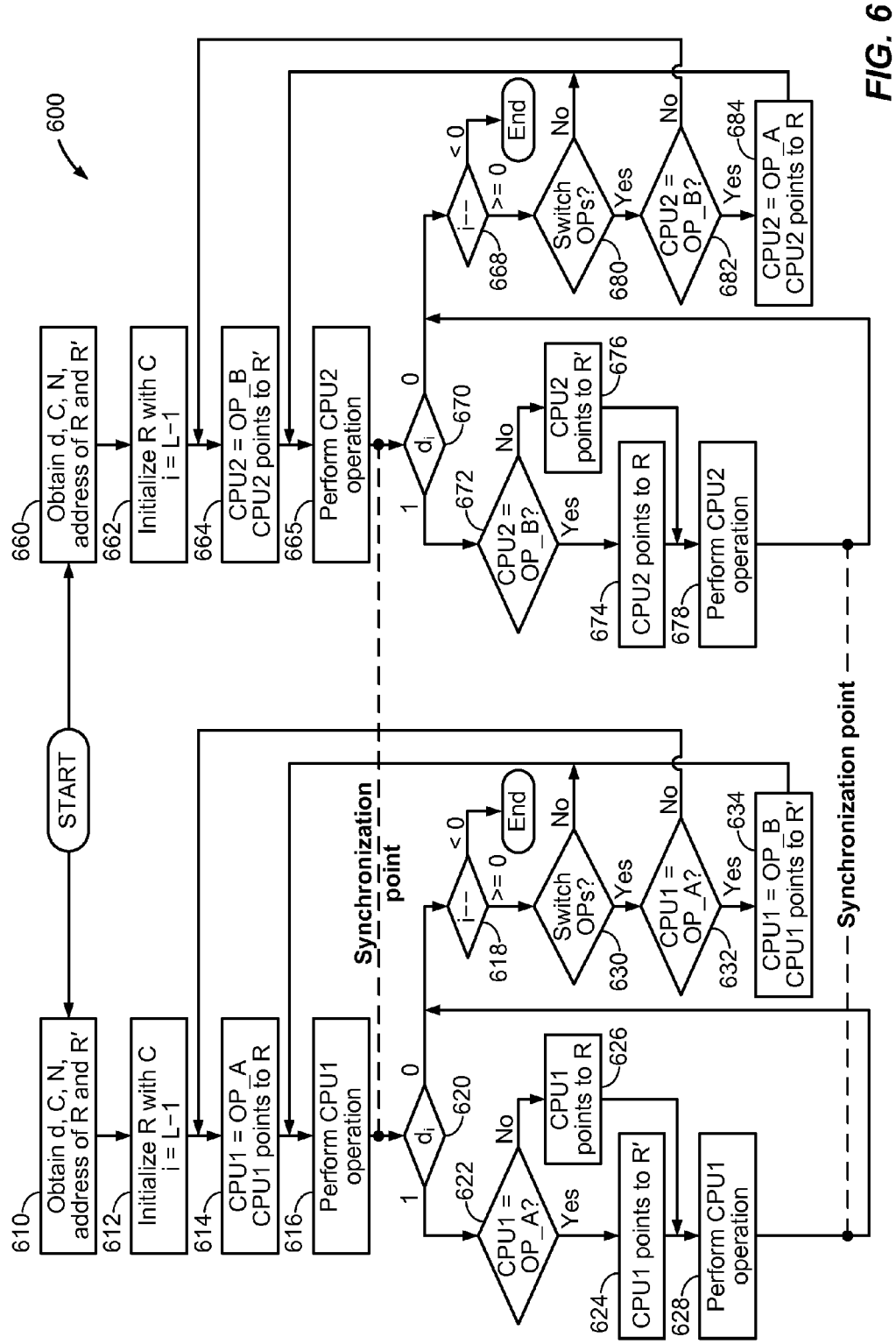
FIG. 6 is a flowchart diagram of another example process for resisting side channel analysis.

Referring now to FIG. 6, a flowchart 600 illustrates another example process for distributed cryptographic operations. The process illustrated in flowchart 600 may be implemented on computer system 200 (FIG. 2), and decisions, operation execution assignments and operand assignments may be implemented by control entity 240, or by multicore processor 210 or by one or more of CPUs 210-A-210-D. The process example illustrated in flowchart 600 begins with each of CPU1 and CPU2 obtaining secret exponent d, cipher C, modulus N and the addresses for valid intermediate result R and irrelevant intermediate result R' as illustrated in blocks 610 and 660. Cipher C is the message that is the subject of the cryptographic operation, e.g., encryption, signature or decryption. Modulus N is usually provided in conjunction with the public or private key, such as, for example, with secret exponent d. Secret exponent d the private key used in the cryptographic process, and is kept confidential to ensure the integrity of the cryptographic process. Secret exponent d also provides a parameter L that reflects the length in number of bits of secret exponent d. The addresses for valid intermediate result R and irrelevant intermediate result R' can be provided in the form of pointers, and can be set to the same value, e.g., the address of valid intermediate result R. The address for irrelevant intermediate result R' can also be provided as an arbitrary value, or refer to a memory location that is arbitrary.

Blocks 612 and 662 illustrate initialization of variables for the cryptographic process. Both of valid intermediate result R and irrelevant intermediate result R' are initialized to the value of C. A loop counter i that represents an index in the bit string representation of secret exponent d is initialized to a value of L−1. In this example, a most significant bit of secret exponent d is used as a starting point for an encryption/decryption process. An alternate algorithm can be constructed that would start from the least significant bit of the secret exponent d, in which case loop counter i would be initialized to 0 and incremented during the process.

Blocks 614 and 664 illustrate the assignment of an operation to the respective CPUs, and the provision of a pointer to a respective operand. Block 614 illustrates CPU1 being assigned operation OP_A, which in this example is a modular squaring operation. Also, CPU1 is provided with a pointer or address to valid intermediate result R. Block 664 illustrates CPU2 being assigned operation OP_B, which in this example is a modular multiplying operation. Also, CPU2 is provided with a pointer or address to irrelevant intermediate result R'.

Blocks 616 and 665 illustrate CPU1 and CPU2 executing assigned operations. As described in greater detail below, CPU1 may be assigned to execute OP_A or OP_B on valid intermediate result R or irrelevant intermediate result R', respectively, at block 616. CPU2 may be assigned to execute OP_A or OP_B on irrelevant intermediate result R' or valid intermediate result R, respectively, at block 665. The modular squaring operation performed by OP_A is $R^2$ mod N, while the modular multiplying operation performed by OP_B is $R'*C$ mod N. CPU1 and CPU2 are initialized to perform OP_A and OP_B, respectively, but can be configured to change the operations being executed, as described below. CPU1 is initialized to use valid intermediate result R as an operand, and CPU2 is initialized to use irrelevant intermediate result R' as an operand. Both of CPU1 and CPU2 can be configured to always use valid data as an operand, e.g., the value referenced by valid intermediate result R. In such an example, the results of the operations performed on the valid data that are irrelevant can be discarded, or stored in irrelevant intermediate result R'. The results of the operations performed on the valid data that are relevant, intended or desired are stored in valid intermediate result R. CPU1 and CPU2 can each represent one or more CPUs, including multicore CPUs, multicore processors, physically distinct processor chips, combinations of GPUs (graphics processing units) and special purpose processors or processor cores, or any other configuration of multiple CPUs.

As the operations assigned to CPU1 and CPU2 are performed as illustrated in blocks 616 and 665, a synchronization operation can optionally be implemented to ensure synchronization between CPU1 and CPU2. For example, if a modular squaring operation executed by CPU1 finishes earlier than a modular multiplying operation executed by CPU2, CPU1 carrying out the modular squaring operation can be configured to execute additional non-operations (NOPs) until the modular multiplying operation executing on CPU2 finishes. Alternatively, CPU1 can be placed in a polling loop that waits for an indication of the completion of the multiplying operation by CPU2. The operations on either of CPU1 or CPU2 may finish sooner or later than the other CPU, so that synchronization compensation may apply to either or both of CPU1 or CPU2. In addition, other forms of synchronization may be implemented, such as by speeding up or slowing down CPU execution, or by determining operation execution time on a probabilistic basis, or any other form that permits synchronization of CPU1 and CPU2 to maintain concurrent execution of components of the cryptographic process in a given cycle or iteration. The synchronization may be applied to multiple CPUs executing either a squaring operation or a multiplying operation, such as by employing or adding more CPUs to execute an operation that is anticipated to or actually does take longer to execute than other operations.

The process continues by testing component $d_i$ of secret exponent d, e.g., the current bit under inspection, to determine if component $d_i$ is equal to 1 or 0, as illustrated in decision blocks 620 and 670. If component $d_i$ of secret exponent d is equal to 0, the cryptographic process proceeds to the next iteration, as illustrated by the 0 branch from decision blocks 620 and 670 leading to respective decision blocks 618 and 668. If component $d_i$ of secret exponent d is equal to 1, the cryptographic process proceeds to a multiplying step, as illustrated with the 1 branch from decision blocks 620 and 670 leading to respective decision blocks 622 and 672.

Decision blocks 622 and 672 illustrate a respective determination of whether CPU1 is assigned to execute OP_A and whether CPU2 is assigned to execute OP_B. If CPU1 is assigned to execute OP_A, as indicated by the Yes branch from decision block 622, then CPU1 is provided with access to irrelevant intermediate result R' as an operand to OP_A as illustrated in a block 624. Otherwise, CPU1 is understood to be assigned to execute OP_B, as indicated by the No branch from decision block 622, and is provided with access to valid intermediate result R as an operand to OP_B, as is illustrated in a block 626. If CPU2 is assigned to execute OP_B, as indicated by the Yes branch from decision block 672, then CPU2 is provided with access to valid intermediate result R as an operand to OP_B as illustrated in a block 674. Otherwise, CPU2 is understood to be assigned to execute OP_A, as indicated by the No branch from decision block 672, and is provided with access to irrelevant intermediate result R' as an operand to OP_A, as is illustrated in a block 676.

Blocks 628 and 678 illustrate CPU1 and CPU2 executing assigned operations. As described in greater detail below, CPU1 may be assigned to execute OP_A or OP_B on valid intermediate result R or irrelevant intermediate result R', respectively, at block 628. CPU2 may be assigned to execute OP_A or OP_B on irrelevant intermediate result R' or valid intermediate result R, respectively, at block 678. The modular squaring operation performed by OP_A is $R^2$ mod N, while the modular multiplying operation performed by OP_B is R'*C mod N. With the tests illustrated in decision blocks 622 and 672, the operations assigned for execution to CPU1 and CPU2 can be determined, and the appropriate CPU can be assigned the appropriate operand to ensure that modular multiplying takes place on valid data when execution of the operations illustrated in blocks 628 and 678 takes place.

As the operations assigned to CPU1 and CPU2 are performed as illustrated in blocks 628 and 678, a synchronization operation, such as any of those discussed above, can again be optionally implemented to ensure synchronization between CPU1 and CPU2. Synchronization between CPU1 and CPU2 can mean that (and can be implemented so that) the respectively assigned operations begin execution at a same time or at different times. Synchronization can mean that (and can be configured so that) the operations do not overlap, overlap at least partially, or overlap completely within a cycle or iteration of the cryptographic process.

Once the operations illustrated in blocks 628 and 678 are performed, a loop exit determination is made as illustrated with decision blocks 618 and 668. Decision blocks 618 and 678 illustrate a loop counter i being decremented and tested to determine if the loop should be exited. If, as a result of being decremented, i is less than zero, the process illustrated in flowchart 600 ends. Typically, for an RSA cryptographic process, the last component of secret exponent d to be processed is the least significant bit. Otherwise if the decremented value of i is greater than or equal to 0, the cryptographic process continues as illustrated with the so labeled branch from decision blocks 618 and 668 leading to respective decision blocks 630 and 680.

As illustrated in decision blocks 630, 680, a respective determination is made whether to switch the operations assigned for execution to CPU1 and CPU2. The determination of whether to switch operations between CPU1 and CPU2 can be made on one or more of the same bases discussed above with respect to decision block 432 (FIG. 4). If a determination is made to not switch operations, as indicated by the No branch of decision blocks 630, 680, the process continues with execution of the assigned operations by CPU1 and CPU2, as respectively illustrated in blocks 616, 665. If a determination is made to switch operations, as indicated by the Yes branch of decision blocks 630, 680, respective determinations are made to determine whether CPU1 is assigned to execute OP_A and whether CPU2 is assigned to execute OP_B, as illustrated in decision blocks 632, 682.

If it is determined that CPU1 is assigned to execute OP_A, as illustrated with the Yes branch from decision block 632, then CPU1 is assigned to execute OP_B, and is provided with access to irrelevant intermediate result R', as illustrated in a block 634. Similarly, if it is determined that CPU2 is assigned to execute OP_B, as illustrated with the Yes branch from decision block 682, then CPU2 is assigned to execute OP_A, and is provided with access to valid intermediate result R, as illustrated in a block 684. Once the change in operations assigned for execution to CPU1 and CPU2 is made, CPU1 and CPU2 perform their assigned operations, as illustrated in blocks 616, 665 being reached from blocks 634, 684.

If it is determined that CPU1 is assigned to execute OP_B, as illustrated with the No branch from decision block 632, then CPU1 is assigned to execute OP_A, and is provided with access to valid intermediate result R, as illustrated with the No branch from decision block 632 being directed to block 614. Similarly, if it is determined that CPU2 is assigned to execute OP_A, as illustrated with the No branch from decision block 682, then CPU2 is assigned to execute OP_B, and is provided with access to irrelevant intermediate result R', as illustrated with the No branch from decision block 682 being directed to block 664. As discussed above with respect to the process illustrated in flowchart 400 (FIG. 4), changing assignments of operations for execution by CPU1 or CPU2 can be implemented zero, once or a number of times in each cycle or iteration of the cryptographic process illustrated in flowchart 600.

Figure 7:
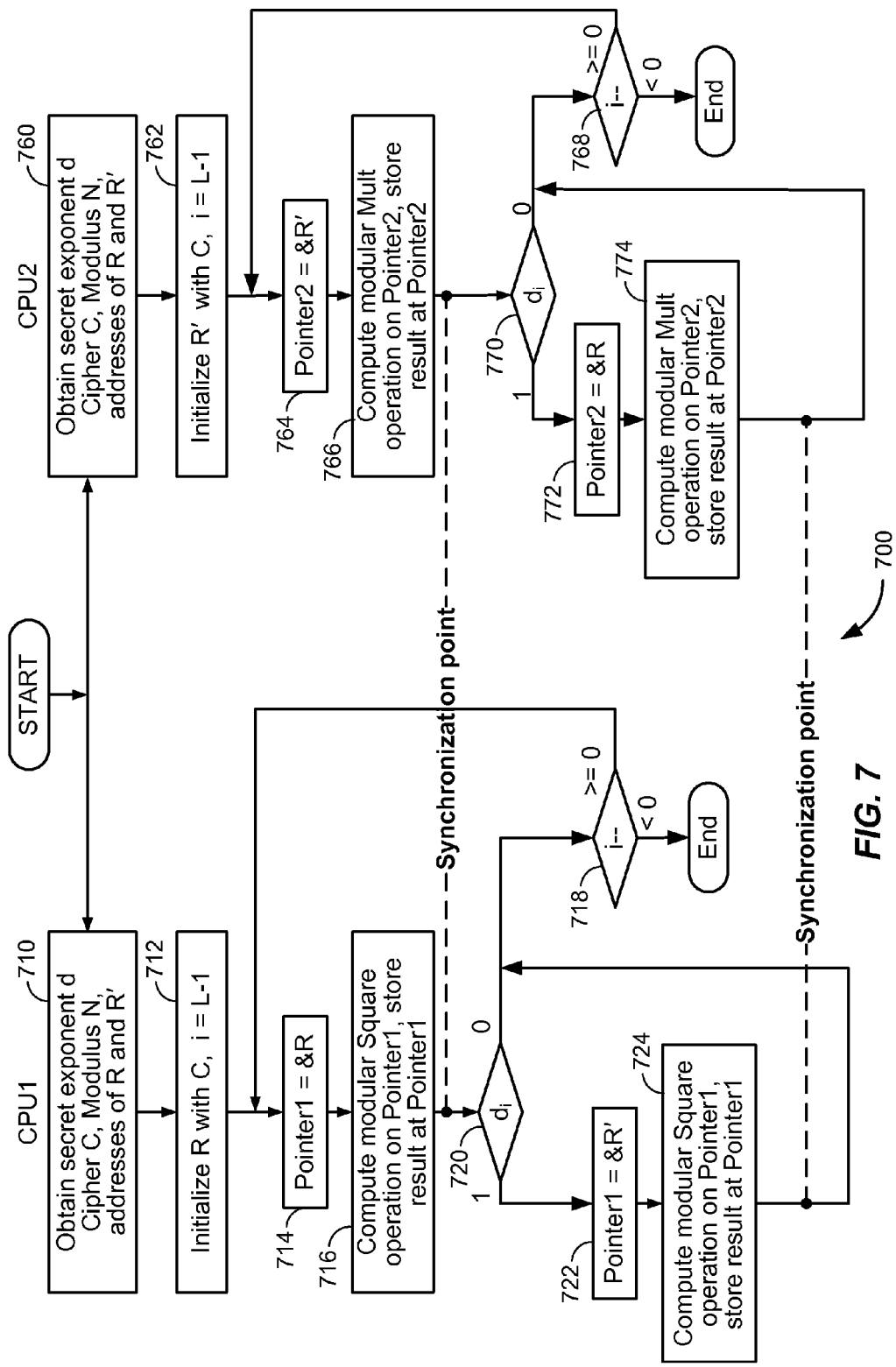
FIG. 7 is a flowchart diagram of another example process for resisting side channel analysis.

Referring now to FIG. 7, a flowchart 700 illustrates another example process for distributed cryptographic operations. The process illustrated in flowchart 700 may be implemented on computer system 200 (FIG. 2), and decisions, operation execution assignments and operand assignments may be implemented by control entity 240, or by multicore processor 210 or by one or more of CPUs 210-A-210-D. Each of CPU1 and CPU2 obtain secret exponent d, cipher C, modulus N and the addresses for valid intermediate result R and irrelevant intermediate result R' as illustrated in blocks 710 and 760. Cipher C is the message that is the subject of the cryptographic operation, e.g., encryption, signature or decryption. Modulus N is usually provided in conjunction with the public or private key, such as, for example, with secret exponent d. Secret exponent d the private key used in the cryptographic process, and is kept confidential to ensure the integrity of the cryptographic process. Secret exponent d also provides a parameter L that reflects the length in number of bits of secret exponent d. The addresses for valid intermediate result R and irrelevant intermediate result R' can be provided in the form of pointers, and can be set to the same value, e.g., the address of valid intermediate result R. The address for irrelevant intermediate result R' can also be provided as an arbitrary value, or refer to a memory location that is arbitrary.

Blocks 712 and 762 illustrate initialization of variables for the cryptographic process. Both of valid intermediate result R and irrelevant intermediate result R' are initialized to the value of C. A loop counter i that represents an index in the bit string representation of secret exponent d is also initialized to a value of L−1. In this example, a most significant bit of secret exponent d is used as a starting point for an encryption/decryption process. An alternate algorithm can be constructed that would start from the least significant bit of the secret exponent d, in which case loop counter i would be initialized to 0 and incremented during each process iteration.

Blocks 714 and 764 illustrate a portion of the cryptographic process that respectively references valid intermediate result R, as well as irrelevant intermediate result R'. The portion of the cryptographic process illustrated in block 714 causes a pointer variable named Pointer1 to be set to an address of valid intermediate result R. Block 764 illustrates the setting of a pointer variable named Pointer2 to an address of irrelevant intermediate results R'. Since blocks 714 and 764 are inside the iteration loops illustrated in flowchart 700, pointers Pointer1 and Pointer2 are reset with each iteration to respective addresses for valid intermediate result R and irrelevant intermediate result R'. In this way, a squaring operation, such as squaring operation 310 (FIG. 3), at the beginning of an iteration of the cryptographic process uses valid intermediate result R as an operand. A multiplying operation, such as multiplying operation 320 (FIG. 3), at the beginning of an iteration of the cryptographic process uses irrelevant intermediate result R' as an operand.

With valid intermediate result R and irrelevant intermediate result R' being respectively referenced by Pointer1 and Pointer2, the squaring and multiplying operations are performed on respective ones of CPU1 and CPU2, as illustrated in blocks 716 and 766. The squaring operation performed in block 716 is $R^2$ mod N and is executed on CPU1, while the multiplying operation performed in block 766 is R'*C mod N and is executed on CPU2. CPU1 and CPU2 each perform the same respective operations of squaring and multiplying throughout the process illustrated in flowchart 700. In block 716, CPU1 uses valid intermediate result R as an operand, while in block 766 CPU2 uses irrelevant intermediate result R' as an operand. CPU1 and CPU2 can each represent one or more CPUs, including multicore CPUs, multicore processors, physically distinct processor chips, combinations of GPUs (graphics processing units) and special purpose processors or processor cores, or any other configuration of multiple CPUs.

As the squaring and multiplying operations are performed as illustrated in blocks 716 and 766, a synchronization operation is optionally implemented to ensure synchronization between CPU1 and CPU2. Synchronization can be defined as discussed above, with respect to the operations illustrated and described with flowchart 600 (FIG. 6).

Component $d_i$ of secret exponent d, e.g., the current bit under inspection, is evaluated to determine if component $d_i$ is equal to 1 or 0, as illustrated in decision blocks 720 and 770. If the component of secret exponent d is equal to 0, the cryptographic process proceeds to the next iteration, as illustrated by the 0 branch from decision blocks 720 and 770 leading to respective decision blocks 718 and 768. If the current component of secret exponent d is equal to 1, the cryptographic process proceeds to a multiplying step, as illustrated with the 1 branch from decision blocks 720 and 770 leading to respective blocks 722 and 772.

Blocks 722 and 772 illustrate the switching of references between valid intermediate result R and irrelevant intermediate result R'. In block 722, Pointer1 used by CPU1 is set to reference irrelevant intermediate result R' as an operand for the squaring step. In block 772, Pointer2 used by CPU2 is set to reference valid intermediate result R as an operand for the multiplying step. CPU1 carries out a squaring step using irrelevant intermediate result R' referenced by Pointer1 as illustrated in a block 724. CPU2 carries out a multiplying step using valid intermediate result R referenced by Pointer2 as illustrated in a block 774. Accordingly, when $d_i$ is a 1, CPU1 executes a modular squaring operation $(R')^2$ mod N using irrelevant intermediate result R' as an operand and CPU2 executes a modular multiplying operation R*C mod N using valid intermediate result R. In accordance with these operations, CPU1 and CPU2 respectively execute squaring and multiplying operations on a consistent basis, regardless of whether they are acting on valid or irrelevant data.

As the respective squaring and multiplying operations are performed as illustrated in blocks 724 and 774, a synchronization operation is again implemented to ensure synchronization between CPU1 and CPU2. For example, if the multiplying operation implemented in block 774 finishes earlier than the squaring operation implemented in block 724, CPU2 carrying out the multiplying operation can be configured to execute additional non-operations (NOPs) until the squaring operation executing on CPU1 finishes. Alternatively, CPU2 can be placed in a polling loop that waits for an indication of the completion of the squaring operation by CPU1. The operations on either of CPU1 or CPU2 may finish sooner or later than the other CPU, so that synchronization compensation may apply to either or both of CPU1 or CPU2. In addition, other forms of synchronization may be implemented, as is discussed above in greater detail.

Once the operations illustrated in blocks 724 and 774 are performed, a loop exit determination is made at decision blocks 718 and 768. Decision blocks 718 and 768 illustrate loop counter i being decremented and tested to determine if the loop should be exited. If, as a result of being decremented, i is less than zero (<0), the cryptographic process illustrated in flowchart 700 ends. Typically, for an RSA cryptographic process, the last component of secret exponent d to be processed is the least significant bit. If the decremented value of i is greater than or equal to zero (>=0), the cryptographic process continues with another iteration as indicated by the so labeled branch from decision blocks 718 and 768 leading to respective blocks 714 and 764.

The processes illustrated in flowcharts 400, 500, 600 and/or 700 can be modified, such as by adding, deleting, combining and/or changing steps or processes. For example, the described pointers need not be used to reference valid intermediate result R and irrelevant intermediate result R'. Other reference techniques, such as storing the operands in the appropriate CPU(s), can be employed, for example. In addition, a reference for irrelevant intermediate result R' need not be maintained, since arbitrary data may be used as a substitute operand, which arbitrary data may be sourced from an arbitrary resource. Moreover, specifically tailored values for irrelevant intermediate result R' can be employed for various purposes, such as contributing to obscuring the squaring or multiplying operations. Still other modifications are possible.

Flowcharts 400, 500, 600 and 700 are directed to operations implemented to realize a cryptographic process that employs an RSA algorithm. For example, flowcharts 400, 500, 600 and 700 illustrate squaring and multiplying operations that are applied in a certain sequence to encrypt/decrypt communication/cipher C in accordance with the RSA algorithm. However, the techniques discussed herein are applicable to other cryptographic processes, including an ECC (Elliptic Curve Cryptography) algorithm, which uses public key cryptography similar to the RSA process. The ECC process typically executes a number of doubling and addition operations for encryption or decryption, which correspond to the squaring and multiplying operations that are employed in the RSA algorithm. An SCA attack on the ECC algorithm typically seeks to determine when either of the doubling or addition operations is carried out, and then relates those operations to bits that form the encryption key. As with the RSA algorithm, the ECC algorithm uses the distributed approach provided by the architectures and techniques of the present disclosure, where the operations related to the bits that form the encryption key are divided among CPUs. One or more CPUs are thus responsible for a doubling operation, while one or more CPUs are responsible for an addition operation. The doubling operation and the addition operation are each executed in each iteration of the ECC algorithm by the separate CPUs, where either the doubling operation or the addition operation is performed on irrelevant data. As with the above described RSA algorithm, analysis of side channel signals reveals a series of doubling operations and addition operations, and thus obscures any differentiation of operations in relation to the encryption key. The distributed CPU implementation of the ECC algorithm, like the RSA algorithm described above, includes synchronization points following respective doubling or addition operations. As with the RSA algorithm, synchronization of distributed CPUs implementing the ECC algorithm contributes to obscuring the content of the encryption key in an SCA attack. For example, an SCA attack based on timing can be made less likely to succeed when the distributed CPUs are synchronized.

Although flowcharts 400, 500, 600 and/or 700 describe operation of a cryptographic process that uses CPU1 and CPU2, other variations are possible and contemplated. For example, CPU1 and/or CPU2 can be composed of a number of CPUs, such as may be implemented with symmetric multicore processors, chip multi-processors, heterogeneous multicores (e.g., a CPU plus a graphics processing unit (GPU), or in general a CPU plus accelerators) as well as clusters of CPUs. In general, a CPU is an individual set of control and storage components that may include a controller, various purpose storage registers, an input/output section and an arithmetic logic unit. Thus, a distributed architecture or application may be used, where multiple CPUs can be instructed to compute some or all of a squaring or multiplying operation in the case of an RSA algorithm, or to compute some or all of a doubling or addition operation in the case of an ECC algorithm.

Figure 8:
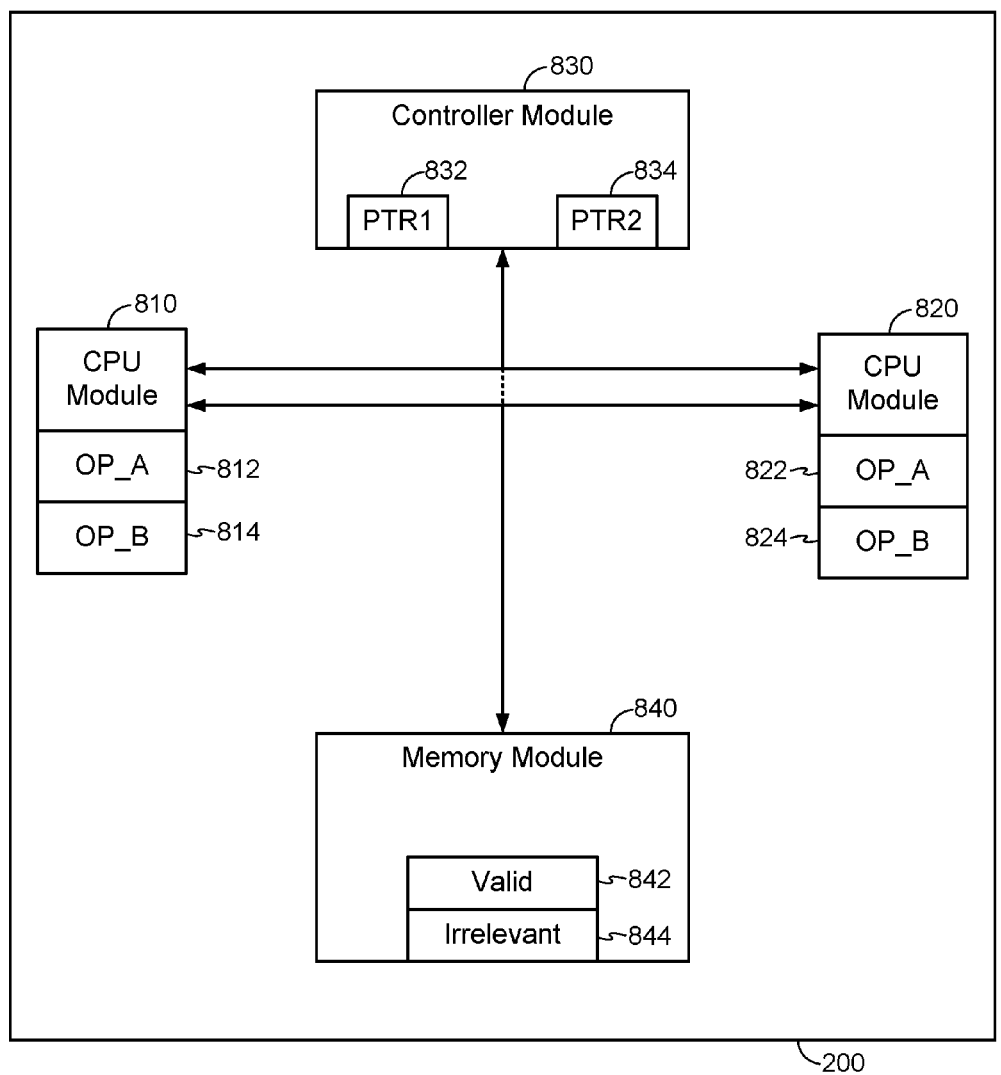
FIG. 8 is a functional block diagram of the computer system shown in FIG. 2.

Referring to FIG. 8, an example implementation of computer system 200 (FIG. 2) includes system configuration 800, which includes a CPU module 810, a CPU module 820, a controller module 830, and a memory module 840. CPU module 810 and CPU module 820 can each be implemented as a multicore processor, such as processor 210, or can each be implemented as one or more individual CPUs, such as one or more of CPUs 210-A-210-D. Controller module 830 can be implemented as control entity 240, and may be implemented as a process or algorithm on multicore processor 210 or on one or more of CPUs 210-A-210-D. Memory module 840 may be implemented as memory 260.

CPU module 810 is capable of carrying out a number of operations, including an operation 812 (OP_A) and an operation 814 (OP_B). CPU module 820 is also capable of carrying out a number of operations, including an operation 822 (OP_A) and an operation 824 (OP_B). Operation 812 can be the same type as operation 822, and operation 814 can be the same type as operation 824. CPU module 810 and CPU module 820 are communicatively connected to controller module 830, which is capable of selecting different operations for execution in CPU module 810 and module CPU 820. Controller module 830 can thus cause operation 812 or operation 814 to be selected for execution in CPU module 810. Likewise, controller module 830 can cause operation 822 or operation 824 to be selected for execution in CPU module 820.

Memory module 840 includes a location 842 that is used to store, for example, valid intermediate data R. Memory module 840 also includes a location 844 that is used to store, for example, irrelevant intermediate data R'. Memory module 840 is communicatively connected to CPU module 810 and CPU module 820, which permits retrieval and storage of data at locations 842, 844 by either or both of CPU modules 810, 820. Controller module 830 may also be communicatively connected to memory module 840 (shown with dashed line) and may reference locations 842, 844 using, for example, pointers.

Controller module 830 includes a pointer 832 (PTR1) and a pointer 834 (PTR2) that are used to reference locations 842, 844 in memory module 840. Pointers 832, 834 may be implemented as memory locations in multicore processor 210 or in memory 260 (FIG. 2). Controller module 830 provides inputs to CPU module 810 to select operation 812 or operation 814 for execution. Controller module 830 also provides inputs to CPU module 822 to select operation 822 or operation 824 for execution. The selection of respective operations 812, 814 on CPU module 810 and respective operations 822, 824 on CPU module 820 may be performed once at the outset of a cryptographic process, or may be performed multiple times during the cryptographic process. For example, the selected operation 822, 824 on CPU module 820 may change during execution of the cryptographic process. Controller module 830 also provides pointer 832 or pointer 834 to CPU module 810 or CPU module 820, to permit CPU modules 810, 820 to reference and access locations 842, 844 in memory module 840. Controller module 830 can determine which of pointers 832, 834 to provide to which CPU module 810, 820 based on which operation 812, 814, is being executed by CPU module 810 and which operation 822, 824 is being executed by CPU module 820. Controller module 830 can thus cause a distributed RSA or ECC algorithm to be executed on system configuration 800, where each CPU carries out a single type of operation during execution of the algorithm, and the operands for the operations are switched between valid data and irrelevant data. Such an algorithm example is illustrated in FIGS. 5 and 7. In addition, controller module 830 can cause the CPUs to switch the type of operation being executed during algorithm execution, and can switch the operands used in the operations to appropriately execute the algorithm with valid data to achieve a valid result. Such an algorithm example is illustrated in FIGS. 4 and 6.

Figure 9:
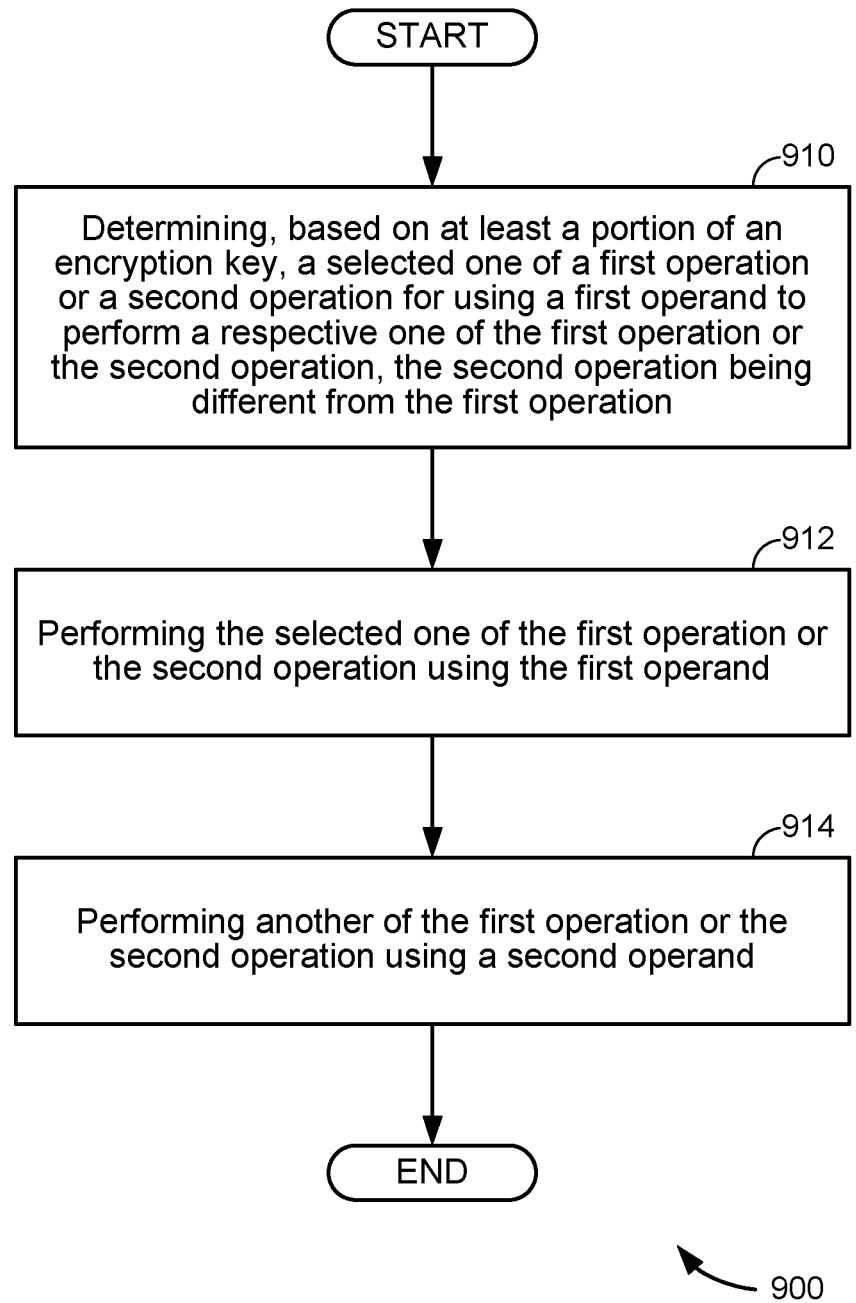
FIG. 9 is a flowchart diagram of another example process for resisting side channel analysis.

Referring to FIG. 9, with further reference to FIGS. 1-8, a process 900 for executing a distributed cryptographic process is illustrated. Process 900 is, however, an example only and not limiting. Process 900 can be altered, e.g., by having stages added, removed, rearranged, combined, performed concurrently, and/or having single stages split into multiple stages.

At stage 910, process 900 includes determining, based on at least a portion of an encryption key d, a selected one of a first operation 812, 822 or a second operation 814, 824 for using a first operand, such as valid intermediate result R, to perform a respective one of the first operation 812, 822 or the second operation 814, 824, the second operation 814, 824 being different from the first operation 812, 822.

At stage 912, process 900 includes performing the selected one of the first operation 812, 822 or the second operation 814, 824 using the first operand, such as valid intermediate result R. At stage 914, process 900 includes performing another of the first operation 812, 822 or the second operation 814, 824 using a second operand, such as irrelevant intermediate result R'.

The side channel signal produced by control entity 240 is faint (single or atomic instruction level) compared to the squaring and multiplying operations (thousands of instructions in the aggregate). The difference in the respective side channel signals can be a couple of orders of magnitude, thus contributing to disassociating the private key from cryptographic operations. The techniques discussed herein can be applied to encryption optimizations like m-ary, sliding window, CRT and Montgomery multiplications with the same expected performance and improved security. Power consumption may be on the order of double that of known single CPU implementations, with twice as many operations overall (about half of the operations being on irrelevant or fake data). However, performance measures of the architectures and techniques disclosed may compare favorably with, e.g., be about the same as, the performance measures of known cryptographic processes that are implemented on a single CPU. Accordingly, improved security regarding side channel analysis is achieved without degrading performance.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media. Such media also provide examples of non-transitory media, which can be machine readable, and wherein computers are an example of a machine that can read from such non-transitory media.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

What is claimed is:

1. An apparatus for implementing a cryptographic process, comprising:
    a first processor circuit configured to execute a first type of operation of the cryptographic process;
    a second processor circuit configured to execute a second type of operation of the cryptographic process, wherein the second type of operation is different from the first type of operation;
    a memory configured to store first information, wherein the memory is accessible by the first processor circuit and the second processor circuit; and
    a control module communicatively coupled to the memory, the first processor circuit and the second processor circuit and configured to provide a pointer to the first information stored in the memory to one of the first processor circuit or the second processor circuit, wherein during the cryptographic process at least one of the first type of operation or the second type of operation is performed at least once to produce irrelevant data,
    wherein the cryptographic process is an encryption process or a decryption process.

2. The apparatus of claim 1, wherein the control module is further configured to provide the pointer to the first information to the first processor circuit or the second processor circuit on the basis of at least a portion of an encryption key.

3. The apparatus of claim 1, wherein the control module is further configured to synchronously launch the cryptographic process on the first processor circuit and the second processor circuit.

4. The apparatus of claim 1, wherein the second processor circuit is configured to execute the second type of operation each time the first processor circuit executes the first type of operation.

5. The apparatus of claim 4, wherein the control module is configured to, for each execution of the first type of operation, provide a pointer to second information stored in the memory to the second processor circuit, the second information comprising valid data or irrelevant data.

6. The apparatus of claim 5, wherein the first processor circuit and the second processor circuit are configured to execute the first type of operation and the second type of operation concurrently.

7. The apparatus of claim 1, wherein the first type of operation is multiplying and the second type of operation is squaring, or the first type of operation is doubling and the second type of operation is addition.

8. The apparatus of claim 1, wherein the first type of operation and the second type of operation are executed twice with each of at least some iterations of the cryptographic process.

9. A method for implementing a cryptographic process, the method comprising:
storing first information in a memory that is accessible by a first processor circuit and a second processor circuit;
determining a first type of operation of the cryptographic process or a second type of operation of the cryptographic process to operate on the first information, wherein during the cryptographic process at least one of the first type of operation or the second type of operation is performed at least once to produce irrelevant data, wherein the cryptographic process is an encryption process or a decryption process;
when it is determined to operate on the first information with the first type of operation:
providing a pointer to the first information to the first processor circuit;
performing the first type of operation using the first processor circuit and the first information; and
performing the second type of operation using the second processor circuit;
when it is determined to operate on the first information with the second type of operation:
providing the pointer to the first information to the second processor circuit;
performing the second type of operation using the second processor circuit and the first information; and
performing the first type of operation using the first processor circuit.

10. The method of claim 9, further comprising determining the first type of operation or the second type of operation to operate on the first information on the basis of at least a portion of an encryption key.

11. The method of claim 9, further comprising synchronously executing the first type of operation and the second type of operation.

12. The method of claim 11, wherein synchronously executing the first type of operation and the second type of operation comprises causing the first type of operation to take a first amount of time to perform and causing the second type of operation to take a second amount of time to perform, wherein the first amount of time and the second amount of time are the same.

13. The method of claim 9, further comprising performing the first type of operation and the second type of operation in a same iteration of the cryptographic process.

14. The method of claim 9, wherein the first information comprises valid data or irrelevant data.

15. The method of claim 9, further comprising:
when it is determined to operate on the first information with the second type of operation:
performing the first type of operation using the first processor circuit and a first result of performing the second type of operation; and
performing the second type of operation using the second processor circuit and a second result of performing the first type of operation.

16. The method of claim 9, wherein the first type of operation is multiplying and the second type of operation is squaring, or the first type of operation is doubling and the second type of operation is addition.

17. The method of claim 9, further comprising executing the first type of operation and the second type of operation twice with each of at least some iterations of the cryptographic process.

18. A non-transitory machine-readable medium comprising instructions for implementing a cryptographic process and being configured to cause a machine comprising a memory, a first processor and a second processor to:
store first information in the memory that is accessible by the first processor and the second processor;
determine a first type of operation of the cryptographic process or a second type of operation of the cryptographic process to operate on the first information, wherein during the cryptographic process at least one of the first type of operation or the second type of operation is performed at least once to produce irrelevant data, wherein the cryptographic process is an encryption process or a decryption process;
when it is determine to operate on the first information with the first type of operation:
provide a pointer to the first information to the first processor;
perform the first type of operation using the first processor and the first information; and
perform the second operation using the second processor;
when it is determined to operate on the first information with the second type of operation:
provide the pointer to the first information to the second processor;
perform the second type of operation using the second processor and the first information; and
perform the first type of operation using the first processor.

19. The non-transitory machine-readable medium of claim 18, wherein the instructions are configured to cause the machine to determine the first type of operation or the second type of operation to operate on the first information on the basis of at least a portion of an encryption key.

20. The non-transitory machine-readable medium of claim 18, wherein the instructions are configured to cause the machine to synchronously execute the first type of operation and the second type of operation.

21. The non-transitory machine-readable medium of claim 20, wherein the instructions configured to cause the machine to synchronously execute the first type of operation and the second type of operation comprise instructions configured to cause the first type of operation to take a first amount of time to perform and causing the second type of operation to take a second amount of time to perform, wherein the first amount of time and the second amount of time are the same.

22. The non-transitory machine-readable medium of claim 18, wherein the instructions are configured to cause the machine to perform the second type of operation in a same iteration of the cryptographic process when the first type of operation is performed.

23. The non-transitory machine-readable medium of claim 18, wherein the instructions are configured to cause the machine to:
when it is determined to operate on the first information with the second type of operation:
perform the first type of operation using the first processor and a first result of performing the second operation; and perform the second type of operation using the second processor and a second result of performing the first type of operation.

24. The non-transitory machine-readable medium of claim 18, wherein the first type of operation is multiplying and the second type of operation is squaring, or the first type of operation is doubling and the second type of operation is addition.

25. The non-transitory machine-readable medium of claim 18, wherein the instructions are configured to cause the machine to execute the first type of operation and the second type of operation twice with each of at least some iterations of the cryptographic process.

26. An apparatus for implementing a cryptographic process, comprising:
   first executing means for executing a first type of operation of the cryptographic process, wherein the first executing means includes a first processor circuit;
   second executing means for executing a second type of operation of the cryptographic process, wherein the second means are different from the first means, wherein the second executing means includes a second processor circuit;
   a storing means for storing first information, wherein the storing means is accessible by the first executing means and the second executing means;
   providing means for providing a pointer to the first information to one of the first means or the second means, wherein during the cryptographic process at least one of the first type of operation or the second type of operation is performed at least once to produce irrelevant data,
   wherein the cryptographic process is an encryption process or a decryption process.

27. The apparatus of claim 26, further comprising determining means for determining the first type of operation or the second type of operation to operate on first information on the basis of at least a portion of an encryption key.

28. The apparatus of claim 26, further comprising performing means for performing the second type of operation each time the means for performing first type of operation executes.

29. The apparatus of claim 28, further comprising additional providing means for providing second information to the first means or the second means, the second information comprising valid data or irrelevant data.

30. The apparatus of claim 26, wherein the first type of operation is multiplying and the second type of operation is squaring, or the first type of operation is doubling and the second type of operation is addition.

* * * * *